US012162492B2

United States Patent
Abad et al.

(10) Patent No.: US 12,162,492 B2
(45) Date of Patent: Dec. 10, 2024

(54) LANE ADJUSTMENT TECHNIQUES FOR SLOW LEAD AGENTS

(71) Applicant: Waymo LLC, Mountain View, CA (US)

(72) Inventors: Pablo Abad, San Francisco, CA (US); Karen Rajen Parikh, Mountain View, CA (US); Kang Li, Sammamish, WA (US); David Garber, Mountain View, CA (US); Tony Grue, Thousand Oaks, CA (US); Khawaja Waqee Khalid, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 378 days.

(21) Appl. No.: 17/812,317

(22) Filed: Jul. 13, 2022

(65) Prior Publication Data

US 2024/0017726 A1    Jan. 18, 2024

(51) Int. Cl.
*B60W 30/18* (2012.01)
*B60W 30/16* (2020.01)
(Continued)

(52) U.S. Cl.
CPC ...... *B60W 30/18163* (2013.01); *B60W 30/16* (2013.01); *B60W 40/04* (2013.01);
(Continued)

(58) Field of Classification Search
CPC .......... B60W 30/18163; B60W 30/16; B60W 40/04; B60W 60/0011; B60W 60/0015;
(Continued)

(56) References Cited

U.S. PATENT DOCUMENTS 11,001,256 B2    5/2021 Packer
2011/0166740 A1*  7/2011 Desborough ......... B60W 10/08
                                                      701/31.4
(Continued)

FOREIGN PATENT DOCUMENTS

DE    102020210828 A1   3/2022
JP       2020015480 A   1/2020
JP       2021041828 A   3/2021

OTHER PUBLICATIONS

Zhou et al., "Multi-agent reinforcement learning for cooperative lane changing of connected and autonomous vehichles in mixed traffic", Autonomous Intelligent Systems, 2(5):1-11 (2022).

*Primary Examiner* — Muhammad Shafi
(74) *Attorney, Agent, or Firm* — McDonnell Boehnen Hulbert & Berghoff LLP

(57) ABSTRACT

Example embodiments relate to lane adjustment techniques for slow lead agents. A vehicle computing system may use sensor data depicting the surrounding environment to detect when another vehicle is traveling in front of the vehicle at a speed that is less than a threshold minimum speed. If the other vehicle fails to increase speed above the minimum speed, the computing system may determine whether to change lanes to avoid the other vehicle based on speed data for other lanes. In some implementations, the computing system assigns penalties to lane segments surrounding the vehicle based on speed data for the different lane segments. For instance, the path finding system for the vehicle can use penalties and speed data to determine efficient routes that safely circumvent slow agents.

19 Claims, 13 Drawing Sheets

(51) Int. Cl.
*B60W 40/04* (2006.01)
*B60W 60/00* (2020.01)
*G06V 20/58* (2022.01)

(52) U.S. Cl.
CPC .... *B60W 60/0011* (2020.02); *B60W 60/0015* (2020.02); *G06V 20/582* (2022.01); *B60W 2300/145* (2013.01); *B60W 2420/403* (2013.01); *B60W 2530/205* (2020.02); *B60W 2554/4041* (2020.02); *B60W 2554/406* (2020.02); *B60W 2554/80* (2020.02); *B60W 2555/60* (2020.02)

(58) Field of Classification Search
CPC ..... B60W 2300/145; B60W 2420/403; B60W 2530/205; B60W 2554/4041; B60W 2554/406; B60W 2554/80; B60W 2555/60; B60W 2554/4042; B60W 2554/408; B60W 2556/45; B60W 2556/50; G06V 20/582; G06V 20/58
USPC ........................................................ 701/301
See application file for complete search history.

(56) References Cited

U.S. PATENT DOCUMENTS

| | | |
|---|---|---|
| 2019/0176831 A1 | 6/2019 | Moon |
| 2019/0382022 A1 | 12/2019 | Niibo |
| 2021/0171042 A1* | 6/2021 | Hayakawa ............. G08G 1/167 |
| 2021/0276561 A1* | 9/2021 | Hayakawa ........ B60W 30/0956 |

* cited by examiner

LANE ADJUSTMENT TECHNIQUES FOR SLOW LEAD AGENTS

BACKGROUND

Advancements in computing, sensors, and other technologies have enabled vehicles to safely navigate between locations autonomously, i.e., without requiring input from a human driver. By processing sensor measurements of the surrounding environment in near real-time, an autonomous vehicle can safely transport passengers or objects (e.g., cargo) between locations while avoiding obstacles, obeying traffic requirements, and performing other actions that are typically conducted by the driver. Shifting both decision-making and control of the vehicle over to vehicle systems can allow the vehicle's passengers to devote their attention to tasks other than driving.

During freeway driving, it is common for a vehicle to encounter other vehicles that are traveling slower. These vehicles, also referred to herein as slow agents, often include oversized vehicles, partially disabled vehicles, vehicles pulling heavy loads, vehicles pulling onto the shoulder, and vehicles controlled by distracted drivers, among others. A slow agent that is traveling in the same lane and at a position in front of an autonomous vehicle can pose problems for the vehicle. These problems can be amplified when the autonomous vehicle is a truck pulling a trailer or another large type of vehicle that has limited maneuverability when compared to a smaller passenger vehicle. As such, a slow agent can increase the risk that another vehicle will rear-end the autonomous vehicle due to its slow speed behind the slow agent. In addition, the slow agent impacts travel time and delivery schedule for the autonomous vehicle and may also cause the autonomous vehicle's speed to drop below an allowable speed minimum associated with the road.

SUMMARY

Example embodiments relate to lane adjustment techniques for slow lead agents. Disclosed techniques can enable a truck pulling a trailer and other types of vehicles to identify the presence of a slow lead agent and also dynamically determine when an improved path is available that enables the truck to safely pass the slow lead agent in accordance with current environment conditions and rules of the road.

Accordingly, a first example embodiment describes a method. The method involves receiving, at a computing device coupled to a first vehicle, sensor data representing an environment of the first vehicle as the first vehicle navigates a path in a first lane of a multiple lane road. The method also further involves, based on the sensor data, aggregating speed data for a plurality of lane segments. Speed data for a lane segment is based on measurements of one or more vehicles traveling in the lane segment. The method also involves, based on speed data for the plurality of lane segments, detecting a second vehicle traveling in the first lane at a position in front of the first vehicle and at a speed that is less than a minimum threshold speed, and responsive to determining that the speed of the second vehicle failed to increase above the minimum threshold speed by a threshold time, determining whether to cause the first vehicle to perform a lane change maneuver. The method also involves controlling, by the computing device, the first vehicle based on determining whether to cause the first vehicle to perform the lane change maneuver.

Another example embodiment describes a system. The system includes a first vehicle and a computing device coupled to the first vehicle. The computing device is configured to receive sensor data representing an environment of the first vehicle as the first vehicle navigates a path in a first lane of a multiple lane road and configured to aggregate speed data for a plurality of lane segments based on the sensor data. Speed data for a lane segment is based on measurements of one or more vehicles traveling in the lane segment. The computing device is also configured to detect a second vehicle traveling in the first lane at a position in front of the first vehicle and at a speed that is less than a minimum threshold speed based on speed data for the plurality of lane segments. The computing device is also configured to determine whether to cause the first vehicle to perform a lane change maneuver responsive to determining that the speed of the second vehicle failed to increase above the minimum threshold speed by a threshold time. The computing device is further configured to control the first vehicle based on determining whether to cause the first vehicle to perform the lane change maneuver.

An additional example embodiment describes a non-transitory computer-readable medium configured to store instructions, that when executed by a computing device, causes the computing device to perform operations. The operations involve receiving sensor data representing an environment of a first vehicle as the first vehicle navigates a path in a first lane of a multiple lane road and aggregating speed data for a plurality of lane segments based on the sensor data. Speed data for a lane segment is based on measurements of one or more vehicles traveling in the lane segment. The operations also involve detecting a second vehicle traveling in the first lane at a position in front of the first vehicle and at a speed that is less than a minimum threshold speed based on speed data for the plurality of lane segments. The operations further involve, responsive to determining that the speed of the second vehicle failed to increase above the minimum threshold speed by a threshold time, determining whether to cause the first vehicle to perform a lane change maneuver, and controlling the first vehicle based on determining whether to cause the first vehicle to perform the lane change maneuver.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
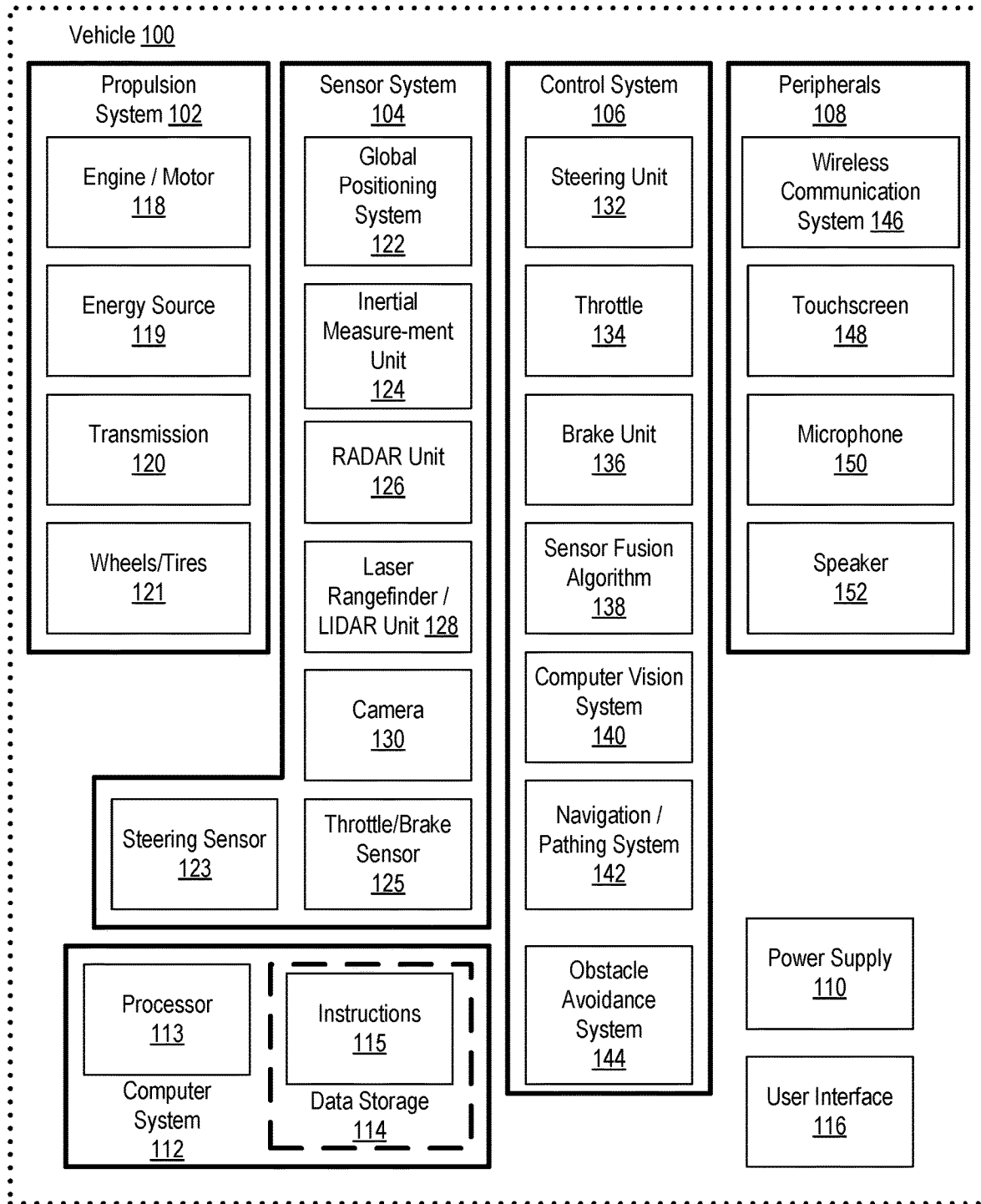
FIG. 1 is a functional block diagram illustrating a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Vehicles often encounter slow lead agents during navigation on highways and other types of roadways. A driver typically determines whether to pass a slow agent or to remain in the same lane behind the slow agent. An autonomous vehicle operating without a driver, however, might fail to efficiently navigate situations involving slow lead agents. One strategy to deal with slow lead agents involves programming an autonomous vehicle to stay in the same lane as the slow lead agent and slow down until the slow lead agent moves out of the way. This simplified strategy increases the likelihood that another vehicle rear-ends the autonomous vehicle since the autonomous vehicle may now be operating at a low speed unsafe for the roadway. In addition, always slowing down for slow lead agents can cause travel delays and make an estimated time of arrival (ETA) to a destination unpredictable since the ETA would then depend on traffic levels throughout the route.

Another strategy that an autonomous vehicle may implement in response to detecting a slow lead agent involves automatically seeking to change lanes if the speed of the detected slow lead agent drops below a predefined speed threshold. This strategy, however, fails to account for situations where the lead agent temporarily decreases speed for a short period, which may make the lane change unnecessary for the autonomous vehicle. For instance, if the autonomous vehicle is a semi-truck pulling a trailer, the autonomous truck may be programmed to travel in the slowest lane during navigation to a destination (e.g., the right most lane) to reduce collision risks. If the autonomous vehicle is also programmed to automatically pass when a lead agent's speed falls below a predefined speed threshold, this can cause issues since the autonomous vehicle might frequently perform lane changes to circumvent slow lead agents while also being programmed to switch back into slow lane after passing each slow lead agent. This can be challenging if the agent's slow speed was a temporary slowdown, which may result in the autonomous vehicle struggling to pass the lead agent. For instance, an agent may slow down temporarily due to the driver experiencing a temporary distraction, for the driver to avoid a pothole, or for other potential reasons. As such, the agent may resume the faster speed, which would make an immediate lane change by the vehicle more difficult. Further, passing the slow lead agent via a lane change may not be prudent in some situations, such as when the autonomous vehicle is traveling on a roadway with an upcoming elevation grade change and/or when there is heavy traffic in the adjacent lane.

An advanced strategy that an autonomous vehicle may use involves monitoring the speed of a lead agent relative to the average speed of traffic on the road. Using a speed threshold that depends on surrounding traffic however can lead the autonomous vehicle to perform sub-optimally in situations where the average traffic speed is greater than the speed limit or the autonomous vehicle's maximum speed and in heavy traffic conditions where performing a lane change is difficult and the ability to overtake other agents is significantly impeded. As an example, a scenario where the average traffic speed is 80 miles per hour (mph), the autonomous vehicle's maximum speed is 65 mph, and the speed threshold is 65 mph (i.e., average speed of traffic minus 15 mph produces a 65 mph speed threshold). In this scenario, the autonomous vehicle is configured to perform a lane change in response to encountering any lead agent traveling at 65 mph. Because this is also the autonomous vehicle's maximum speed, the autonomous vehicle will be unable to pass the lead agent and might impede the traffic traveling in the other lane if the autonomous vehicle attempts the lane change. In another example scenario involving heavy stop-and-go traffic, the autonomous vehicle might attempt to lane change around agents that are temporarily stopped in heavy traffic, which could be difficult and unnecessary given the congestion of the entire roadway.

Example embodiments presented herein relate to lane adjustment techniques for slow lead agents that overcome the shortcomings associated with the above strategies. An autonomous truck or another type of vehicle navigating in an autonomous or semi-autonomous mode may perform disclosed lane adjustment techniques to determine whether to circumvent detected slow lead agents. As an example result, the autonomous truck can safely navigate according to delivery schedules and perform lane changes when the situation and dynamic environment permit. Such techniques can be performed by a variety of vehicles operating in an autonomous or semi-autonomous mode.

An example technique involves implementing a lane change away from a slow lead agent based on a state machine that utilizes a detecting state and a penalizing state. In some examples, a vehicle may include a perception module that is configured to compute traffic statistics for the surrounding environment and a router module configured to decide whether to perform lane changes or other adjustments. The router module can be configured to use outputs from the perception module when determining modifications to the vehicle's current route. These modules can operate as part of one or multiple onboard computing systems.

For the detecting state, one or more vehicle systems (e.g., the perception module) may compute the speeds of the agents around the autonomous vehicle and build aggregate speed statistics per lane segment. The speed statistics can include the average speed, the maximum speed, and the minimum speed, among other data. Vehicle systems can use the speed statistics for various navigation activities, including to check if the autonomous vehicle is behind a slow lead agent. In particular, vehicle systems may check if any lane segment a threshold distance (e.g., 150 meters) directly in front of the autonomous vehicle has a recent minimum speed at or below a slow lead agent speed threshold. If this condition holds true for a given time (e.g., for at least 10 seconds continuously), the state machine used by the vehicle systems may transition to penalizing slow lane segments. The timer can be used to ensure that the autonomous vehicle reacts to agents that have been driving slowly for a continuous period of time. This is to avoid overreacting to agents that have been temporarily slowed down.

In some examples, the timer can be dynamic and based on one or more factors, such as the difference between the current speed of the slow lead agent and the minimum threshold speed. As an example result, vehicle systems may initiate a lane change in a shorter period when the speed of the slow lead agent is significantly lower than the minimum threshold speed. The dynamic timer can be used to enable efficient navigation by the autonomous vehicle that avoids delays caused by slow lead agents that are traveling significantly slower than the pace of traffic on the road.

The speed threshold used by vehicle systems to identify when a lead agent qualifies as a slow lead agent can vary within example embodiments. As an example, the speed threshold can be generated based on monitoring lane changes performed by human drivers of similar vehicles. For instance, data can be accumulated monitoring human drivers in different scenarios that involve the driver performing lane changes to pass a slow lead agent. Statistics gathered via vehicle sensors can convey differences between the particular scenarios when drivers decided to perform a lane change and other scenarios where the drivers decided to stay behind a slow lead agent. In such examples, sensors can also factor the weight and size of the vehicle, external weather, road, and traffic conditions, and other parameters that can be used when developing minimum slow lead agent speed thresholds for subsequent use by autonomous or semi-autonomous vehicles. Models can be developed based on the example scenarios and subsequently used by vehicles to identify slow lead agent scenarios and the appropriate reactions during navigation.

In some examples, the speed threshold used to detect slow lead agents can further depend on vehicle parameters, such as the weight and acceleration capability of the vehicle. Similarly, other factors can also influence the speed threshold, such as the type of cargo being carried, the condition of tires, the condition of the roadway, and the proximity of the next exit for the vehicle, among others. As an example result, vehicle systems located on an autonomous semi-truck pulling a trailer may use a speed threshold for judging a slow lead agent that differs from the speed threshold used when the autonomous semi-truck is not pulling the trailer. Different types of trucks and vehicles, in general, may have custom speed thresholds that are adapted to the parameters of each vehicle individually over time based on slow lead agent encounters by the vehicle.

Vehicle systems can also avoid reacting to a slow lead agent if sensor data shows that the traffic navigating around the autonomous vehicle is also traveling slower than the minimum speed threshold in some cases. In particular, the aggregated speed statistics can indicate the flow of traffic in other lanes around the autonomous vehicle and may be used by vehicle systems when determining if detection of a slow lead agent warrants a lane change. For instance, vehicle systems may avoid reacting to a slow lead agent if there is any lane segment that is not the threshold distance (e.g., 150 meters ahead of the autonomous vehicle) that has had a recent minimum speed at or below the slow lead agent speed threshold. This can enable the autonomous vehicle to refrain from overreacting when changing lanes is not beneficial due to the flow of surrounding traffic.

In some examples, vehicle systems may also factor agent behavior predictions determined for other agents in order to avoid unnecessary reactions. For instance, if the slow lead agent's recent driving behavior indicates that the slow lead agent is likely slowing down in order to pullover onto the shoulder of the road, vehicle systems may avoid initiating a lane change since the slow lead agent appears to be moving out of the autonomous vehicle's lane. Similarly, the behavior of the lead agent can also show that the driver may be temporarily distracted or temporarily reacting to its environment (e.g., debris on the road). By factoring the behavior of the lead agent as well as other agents in the vehicle's environment, vehicle systems can adjust vehicle behavior according to current dynamics of the environment.

For the penalizing state, vehicle systems may penalize slow lane segments surrounding the autonomous vehicle. For instance, vehicle systems may initiate the penalization state after determining that the autonomous vehicle is behind a slow lead agent. Vehicle systems may use the perception traffic data used previously to determine which lane segments to penalize. As an example, vehicle systems may assign a fixed penalty to any lane segment that has a recent minimum speed at or below the slow lead agent speed threshold. The penalty is also applied to the slow lane segment containing the slow lead agent as well as a buffer distance in front of the slow lane segments. For instance, the penalty can be applied to the slow lane segments and 500 meters in front of the slow lane segments.

An outcome of applying a penalty to the padded slow lane segments is that any route that uses these lane segments may be avoided during subsequent route determination, assuming that a better route to the destination exists. If the autonomous vehicle is driving in the typically slowest lane (e.g., the right-most lane of the highway), the route finding module may identify a route that avoids the penalized slow lane segments in front of the vehicle due to one or multiple slow lead agents, which results in a lane change left away from the slow lane segments. In order to generate desired behavior for the autonomous vehicle, vehicle systems may continue to penalize the padded slow lane segments around the autonomous vehicle until the autonomous vehicle has reached a location where there are no additional slow lane segments around it. At this stage, vehicle systems can cause the autonomous vehicle to change to the right lane in order to align with the vehicle's lane selection system.

After the autonomous vehicle has changed lanes into another lane (e.g., a left lane) to avoid the slow lane segments, vehicle systems may continue to apply a fixed penalty to the slow lane segments and a buffer distance in front of it to make sure that the autonomous vehicle clearly passes the slow lead agent. Similar to before, the outcome of applying the fixed penalty to the padded slow lane segments is that any route that uses these lane segments is avoided by the route finding module. In this scenario, the route finding module may determine that the autonomous vehicle should continue to navigate forward in the new lane to avoid the slow lane segments in the old lane and then lane change back into the prior lane (i.e., the right lane) once the slow lane segments and corresponding buffer distances have been avoided. Non-rightmost lanes may have a small penalty applied to them in order to cause the autonomous vehicle to use routes that are biased to the slow lane (i.e., the right lane) and thus the route finding module will likely cause the lane change back based on the small penalties.

Disclosed techniques can further involve vehicle systems factoring additional information. For instance, road conditions, weather conditions, and vehicle parameters may all be factored when determining whether to initiate a lane change. As an example, wet or snowy road conditions may cause vehicle systems to decrease the minimum speed threshold that is used to identify whether an agent qualifies as a slow lead agent. In addition, the type of the slow lead agent can also influence operations. For instance, vehicle systems may operate differently if the slow lead agent is a motorcycle compared to if the slow lead agent is a vehicle. Similarly, if the slow lead agent is a semi-truck or another large vehicle can also influence operations.

In some examples, a disclosed technique may involve factoring a slow lead agent's driving behavior, conditions in adjacent lanes, and so forth. As described herein, a computing device of a truck or another type of vehicle may receive data from one or more sensors of the truck and may query a sensor data processing unit to determine if a lead vehicle qualifies as a slow lead agent. In some aspects, the query may be limited to within a threshold distance from the truck. Upon a determination that the lead agent qualifies as a slow lead agent, a penalty score may be determined, where the penalty score is based at least in part on the speed of the lead agent. For instance, the computing device may determine that the vehicle's speed remained below a minimum speed threshold continuously for at least a predefined time and may determine the penalty score based on the difference between the vehicle's speed and the minimum speed threshold. The penalty may be added to a cost function associated with one or more alternate paths available to the truck. The computing device may then execute an autonomous driving strategy by selecting a path of the alternate paths, where the selected path minimizes the cost function.

Various factors can be used by a computing device to assign penalties to lane segments during vehicle navigation. The penalties are then used for the subsequent navigation strategy for the vehicle. For example, the position, speed, and other potential behaviors of the lead agent may indicate a probability of whether the lead agent impacts navigation of the truck. The cost function used by a computing device may depend on other vehicles and obstacles in the environment of the truck, a number of alternate available paths, road banking, road grade, weather conditions, road conditions, and so forth. In some examples, the cost function may be based on a presence or absence of a construction zone and potentially the parameters of a construction zone (e.g., geometric and/or geographic parameters, lane closures, partial lane closures, narrower lanes, presence of heavy equipment, construction work schedules, presence or absence of construction workers, debris, and so forth).

Lane change decision making for slow lead agents can be learned using supervised learning using a training dataset comprising real-world and/or simulated scenarios. In some cases, a neural network can be trained based on a loss function that measures travel time, a disengage probability (likelihood that the driving mode will switch to manual), and so forth. In some aspects, inverse reinforcement models may be trained to compute a set of feature weights so that a decision to choose whether to perform a lane change or perform another action approximately mimics an internal "policy" of a human driver of a truck. A comparative analysis of autonomous lane change decisions by a truck and decisions made by a human driver of another truck driving in similar situations may be performed to improve the autonomous driving strategy. In addition, other factors can be considered when performing disclosed techniques.

In some example embodiments, a vehicle performing disclosed techniques may be a Class 8 truck (of a gross vehicle weight rating (GVWR) over 33,000 lbs.), including, for example, tractor trailer trucks, single-unit dump trucks, as well as non-commercial chassis fire trucks. Such vehicles may generally have three or more axles. Other types of vehicles can perform disclosed techniques.

Referring now to the figures, FIG. 1 is a functional block diagram illustrating example vehicle 100, which may be configured to operate fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. In other examples, vehicle 100 may include more or fewer subsystems. The subsystems and components of vehicle 100 may be interconnected in various ways (e.g., wired or wireless connections). In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar unit 126, laser rangefinder/lidar unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects, including the speed and heading of the objects, within the local environment of vehicle 100. As such, radar unit 126 may include antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/lidar 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC)

devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2A:
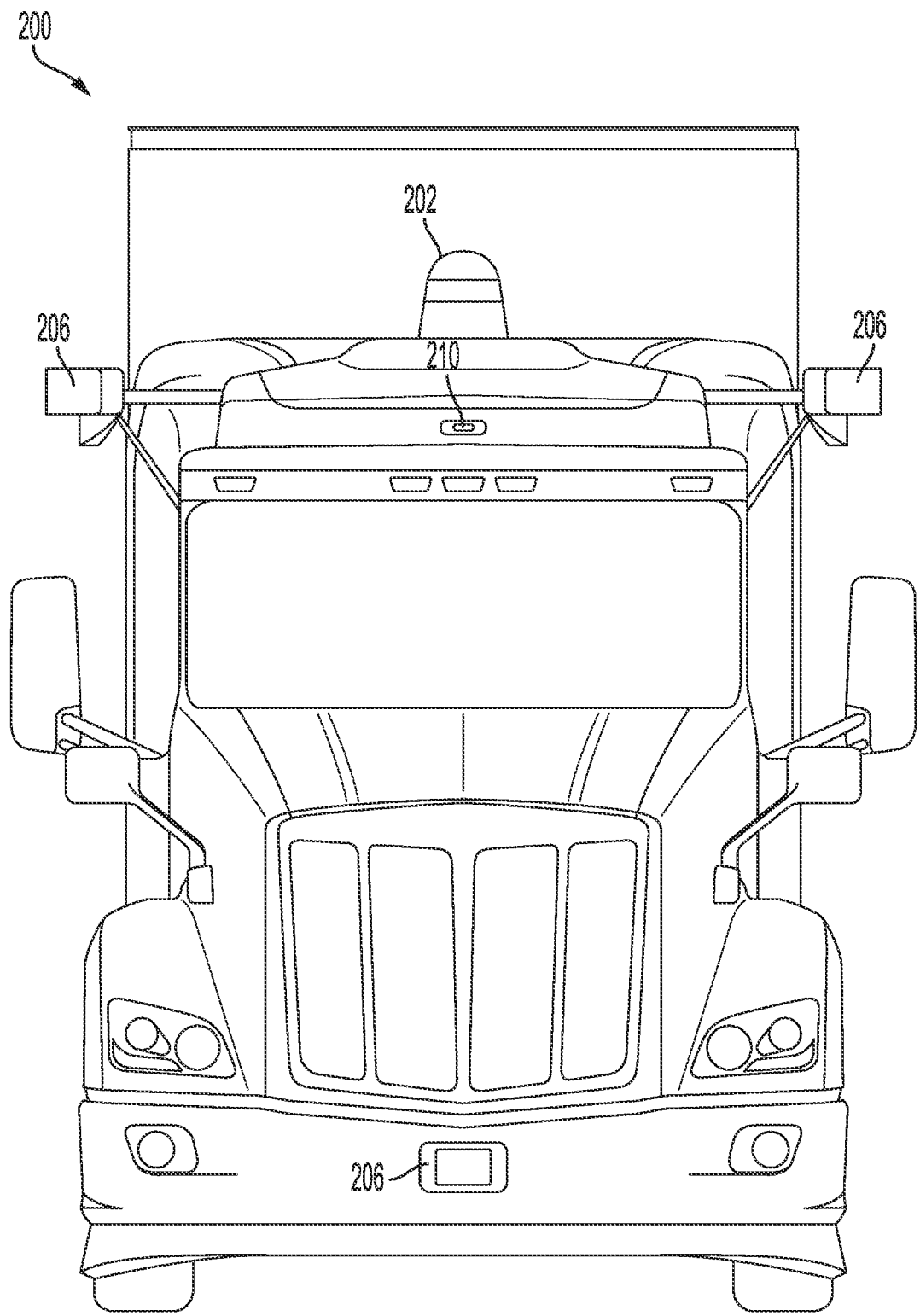
FIG. 2A illustrates a front view of a vehicle, according to one or more example embodiments.
Figure 2B:
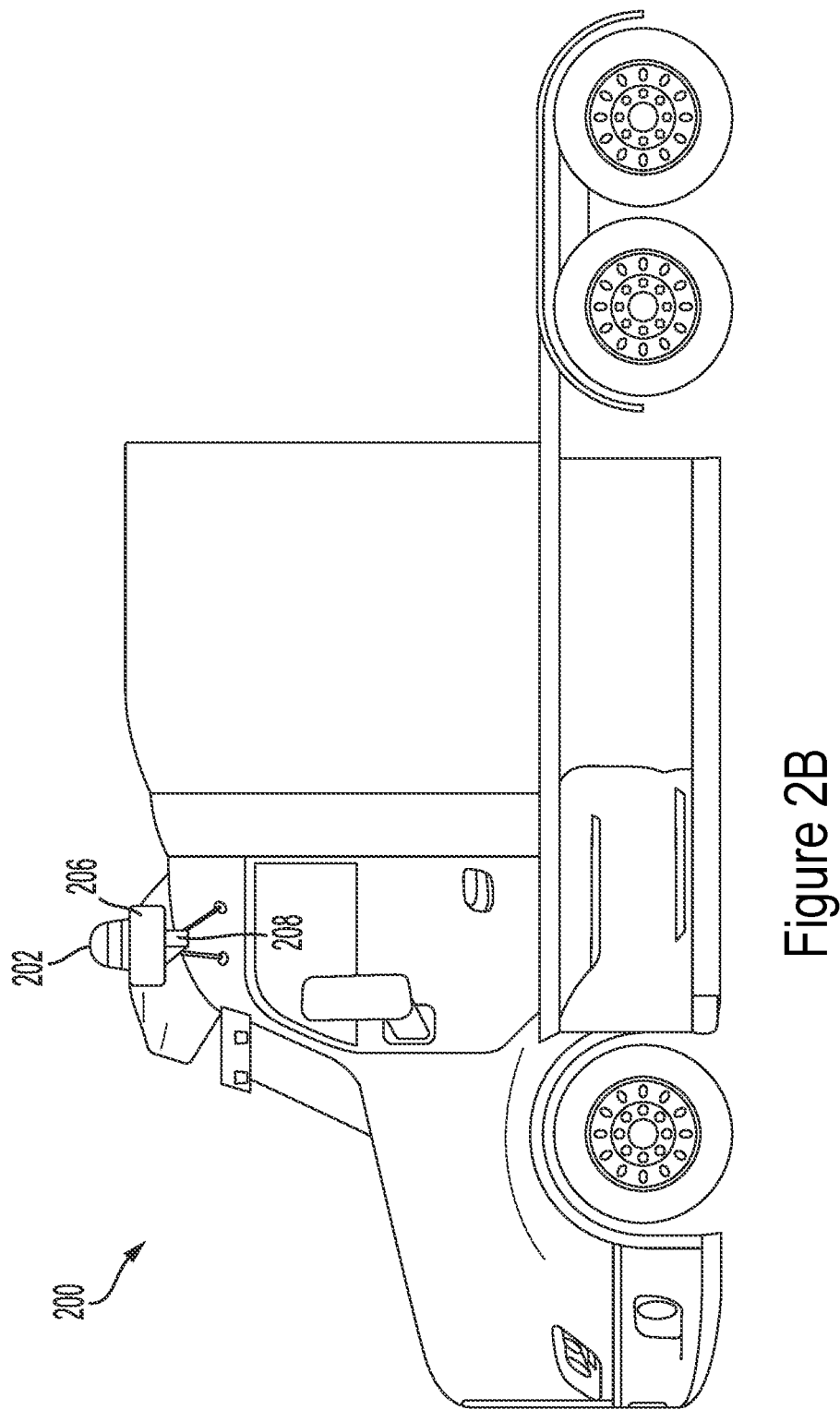
FIG. 2B illustrates a side view of a vehicle, according to one or more example embodiments.
Figure 2C:
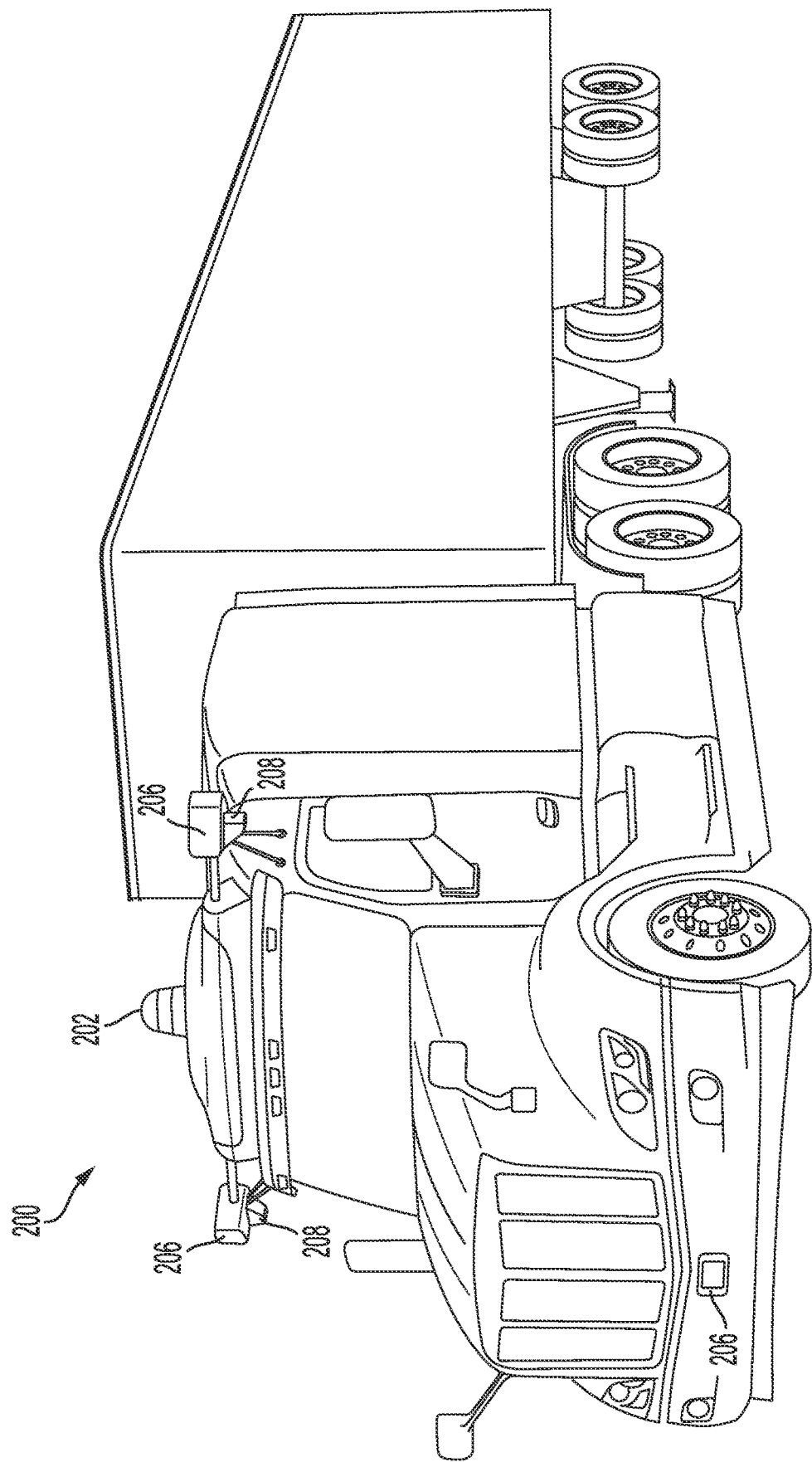
FIG. 2C illustrates a perspective view of a vehicle, according to one or more example embodiments.
Figure 2D:
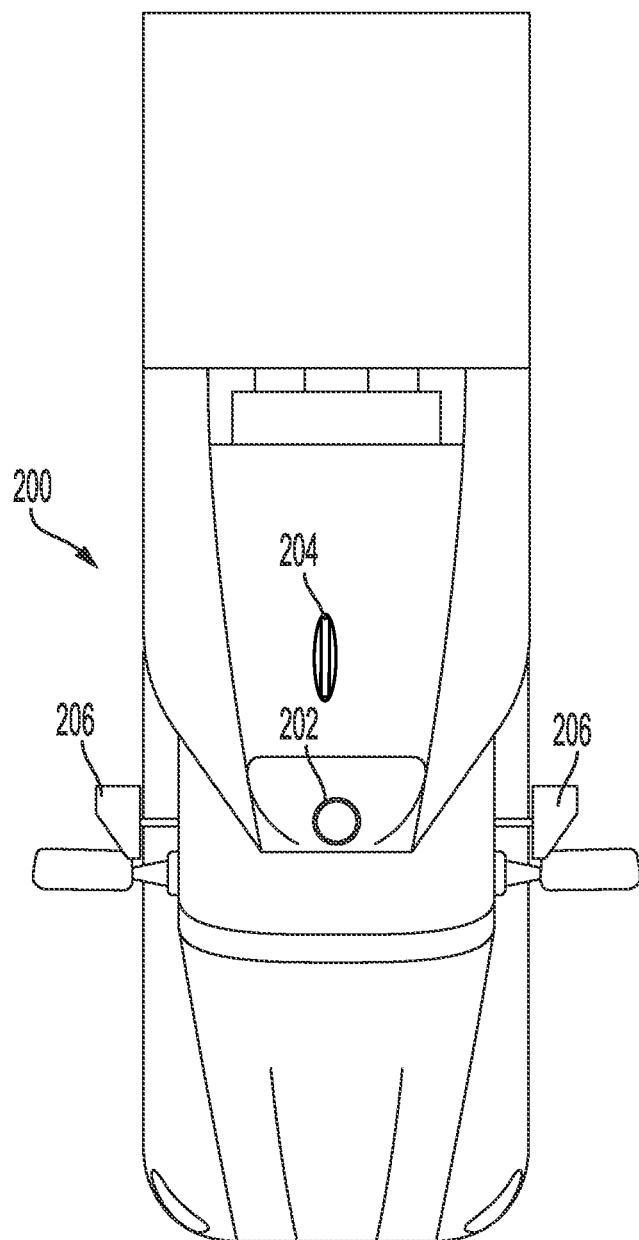
FIG. 2D illustrates a top view of a vehicle, according to one or more example embodiments.

FIG. 2A illustrates a front view of vehicle 200, FIG. 2B illustrates a side view of vehicle 200, FIG. 2C illustrates a perspective view of vehicle 200, and FIG. 2D illustrates a top view of vehicle 200. As such, FIGS. 2A-2D together illustrate an example physical configuration of vehicle 200, which may represent one possible physical configuration of vehicle 100 described in reference to FIG. 1. Depending on the embodiment, vehicle 200 may include sensor unit 202, wireless communication system 204, radar unit 206, lidar units 208, and camera 210, among other possible components. For instance, vehicle 200 may include some or all of the elements of components described in FIG. 1. Although vehicle 200 is depicted in FIG. 2 as a semi-truck, vehicle 200 can have other configurations within examples, such as a car, a van, a motorcycle, a bus, a shuttle, a golf cart, an off-road vehicle, robotic device, a farm vehicle, or other vehicles pulling a trailer among other possible examples.

Sensor unit 202 may include one or more sensors configured to capture information of the surrounding environment of vehicle 200. For example, sensor unit 202 may include any combination of cameras, radars, lidars, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around vehicle 200. The movable mount of sensor unit 202 may also be movable in a scanning fashion within a particular range of angles and/or azimuths.

In some implementations, sensor unit 202 may include mechanical structures that enable sensor unit 202 to be mounted atop the roof of a truck. Additionally, other mounting locations are possible within examples.

Wireless communication system 204 may have a location relative to vehicle 200 as depicted in FIG. 2D, but can also have different locations. Wireless communication system 204 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems. Communication system 204 may include a cellular or wireless data connection. The communication system 204 may be configured to communicate with a remote computing system. The remote computing system may be configured to provide instructions and/or data to the vehicle 200 to aid in its autonomous operation.

The vehicle 200 may include several radar units 206 at various locations. In one example, the vehicle 200 may include a radar unit located on each of the front and back bumpers of the cab portion. Additionally, the vehicle 200 may include two radar units located on each side of the vehicle 200 near the side-view mirrors. The two radar units on the sides of the vehicle may be positioned so that one images a forward right section, one images a forward left section, one images a rear right section, and one images a rear left section. Each radar unit may be configured to transmit and receive radar signals over an angular region defined by a beamwidth of the radar unit. In some examples, each radar unit may be able to perform beam steering on transmit or receive beams. By using beam steering, a radar unit may be able to interrogate a predefined angular direction.

The vehicle 200 may also include lidar units 208 mounted in various locations. For example, lidar units 208 may also be mounted on the sides of the vehicle 200 near the rear-view mirrors. Lidar units 208 may be configured to transmit and receive light signals from the region around the vehicle. Lidar units 208 may be able to image the region around the vehicle 200 from which light reflections are received.

Camera 210 may have various positions relative to the vehicle 200, such as a location above a front windshield of vehicle 200. As such, camera 210 may capture images of the environment. For instance, camera 210 may capture images from a forward-looking view with respect to vehicle 200, but other mounting locations (including movable mounts) and viewing angles of camera 210 are possible within implementations. In some examples, camera 210 may correspond to one or more visible light cameras, but can also be other types of cameras (e.g., infrared sensor). Camera 210 may also include optics that may provide an adjustable field of view.

Figure 3:
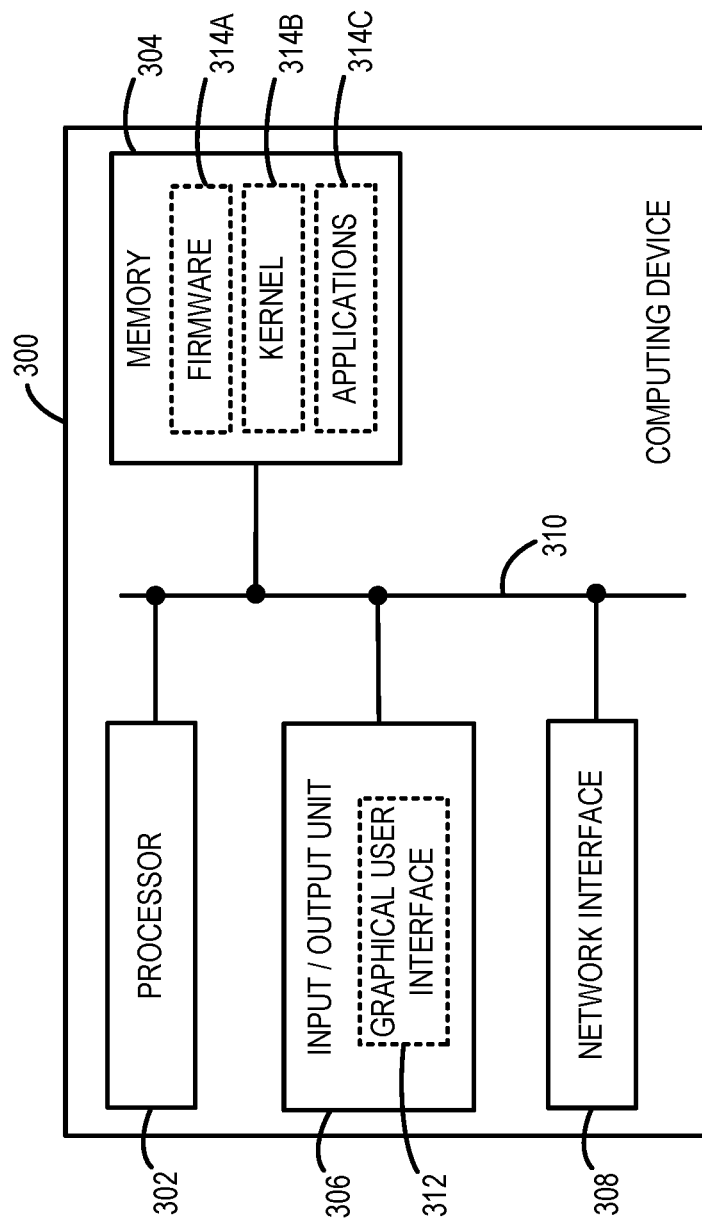
FIG. 3 is a functional block diagram illustrating a computing device, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may involve one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Computing device 300 may perform route optimization techniques described herein. In some cases, computing device 300 may determine route and/or control instructions for a vehicle. In some embodiments, computing device 300 may be onboard a vehicle. In such cases, computing device 300 may analyze sensor data in real-time to optimize maneuverability of the vehicle during navigation. In other embodiments, computing device 300 may be positioned remotely from the vehicle. In such cases, computing device 300 may be an individual computing device or it may be a fleet manager device receiving sensor data from more than one vehicle. Further, analyzing sensor data in such cases may involve running one or more simulations based on the sensor data to determine the level of feasibility of a maneuver for a particular vehicle.

Figure 4A:
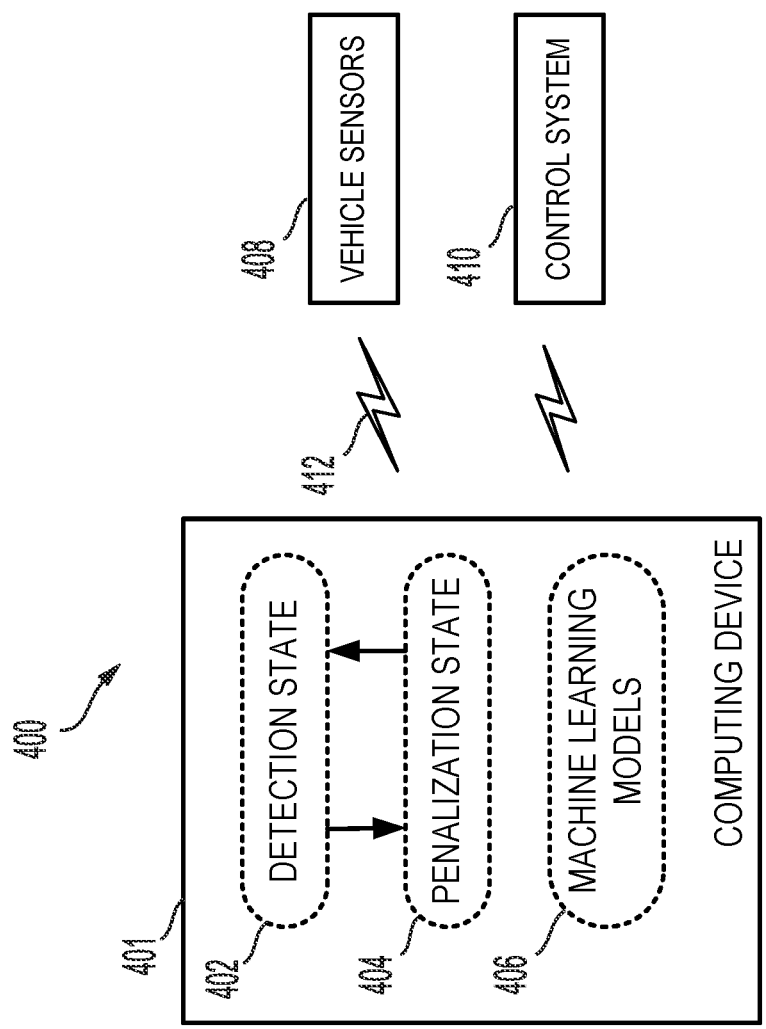
FIG. 4A is a system for automatic lane adjustments, according to one or more example embodiments.

FIG. 4A is system 400 for implementing a lane adjustment technique. In the example embodiment, system 400 includes computing device 401 communicating with vehicle sensors 408 and control system 410. Computing device 401 can perform disclosed lane adjustment techniques to determine whether a vehicle should perform a lane change after detection of a slow lead agent traveling in the same lane as the vehicle. In other examples, system 400 can include more or fewer components in other arrangements.

Computing device 401 represents a vehicle computing system and may involve one or multiple processors performing operations. For instance, computing device 401 can be implemented as computing system 112 in vehicle 100 shown in FIG. 1 or computing device 300 shown in FIG. 3. As such, computing device 401 can operate onboard any type of vehicle and perform operations using incoming data in real-time. In some embodiments, computing device 401 may also include a remote computing system that is communicating wirelessly with onboard computing systems of a vehicle.

In the example embodiment, computing device 401 may perform a lane adjustment technique that involves detection state 402 and penalization state 404. For instance, computing device 401 may perform the lane adjustment technique while the vehicle navigates on a freeway or another type of road (e.g., a multiple lane road). Computing device 401 may use machine learning models 406 in some examples. In addition, computing device 401 may communicate via a wired or wireless connection 412 with vehicle sensors 408 and control system 410.

Detection state 402 can involve determining if there is a slow lead agent in front of the vehicle. As the vehicle travels a path toward a destination, the environment surrounding the vehicle can dynamically change with various agents (e.g., vehicles, pedestrians, cyclists) performing different actions. Computing device 401 may use sensor data from vehicle sensors 408 during detection state 402 to detect and determine if there is another vehicle, pedestrian, or another type of agent positioned in front of the vehicle and traveling less than the speed of the vehicle.

In some embodiments, one or multiple speed thresholds can be used by computing device 401 to identify when an agent qualifies as a slow lead agent. For instance, computing device 401 can compute the speeds of the agents around the vehicle and build aggregate speed statistics for different lane segments (e.g., portions) of the road that can be used to identify when there is a slow lead agent traveling in front of the vehicle. The lane segments can have positions that are based on a current location of the vehicle. As such, the aggregated speed statistics can indicate the average speed, the maximum speed, the minimum speed based on one or more agents that occupied a lane segment.

Computing device 401 can use the aggregated speed statistics to check if the vehicle is behind a slow lead agent. For instance, computing device 401 may determine if there is any lane segment a threshold distance directly in front of the vehicle (e.g., 150 meters) that has a recent minimum speed at or below a speed threshold. The speed threshold may be a minimum speed threshold and can be based on the speed limit of the road and/or other parameters. In addition, the threshold distance can differ within examples.

If the agent remains slower than the minimum speed threshold used for a threshold time, computing device 401 may proceed to penalization state 404. For instance, if the slow lead agent remains in front of the vehicle and at a speed that fails to exceed the minimum speed threshold, computing device 401 may implement penalization state 404. The threshold time may be used to cause the vehicle to react to agents that have been traveling slowly for a continuous period of time and avoid overreacting to agents that have been temporarily slowed down.

In some cases, computing device 401 may refrain from reacting to the slow lead agent if nearby lane segments also have speed data that indicates agent speed under the minimum speed threshold. For instance, the slow lead agent may be the result of traffic, which limits the speed of other vehicles traveling on the road. In such a situation, computing device 401 may refrain from reacting to detecting the slow lead agent. In some instances, the computing device may also adjust the minimum speed threshold based on the speed of other agents operating nearby the vehicle.

Penalization state 404 involves penalizing slow lane segments around the vehicle. In some instances, responsive to determining that the vehicle is behind a slow lead agent, the computing device may proceed with penalizing slow lane segments. For example, the traffic data captured via vehicle sensors 408 can be used to determine which lane segments to penalize. Computing device 401 can penalize any lane segment that has a recent minimum speed at or below the minimum speed threshold. A penalty can also be applied to the slow lane segment as well as a buffer in front of the slow lane segment (e.g., 500 meter buffer).

Applying a penalty to the padded slow lane segments enables a route finding system to avoid these lane segments when computing subsequent routes for the vehicle. In some cases, computing device 401 may implement the route finding system and fail to identify a better route and maintain the current path of the vehicle without any immediate actions (e.g., without changing lanes). In other cases, when the vehicle is driving in the slow lane of a multiple lane road, the route finding algorithm may identify a route that avoids the penalized slow lane segments by using a lane change maneuver away from the slow lane segments.

After the vehicle changes lanes to avoid slow lane segments caused by a slow lead agent, computing device 401 may continue to apply a fixed penalty to the slow lane segments and a buffer in front of the slow lane segments as the vehicle navigates in the new lane. For instance, computing device 401 may penalize the lane segments containing the lead slow agent and an additional 500 meters in front of the lead slow agent. This way, subsequent routes avoid changing back into the prior lane too closely to the slow lead agent. Rather, the vehicle would likely continue forward navigation in this new lane and wait to potentially perform a lane change back into the prior lane after clearly passing the slow lead agent and the additional buffer assigned to the lane segments in front of the slow lane segments.

In some examples, computing device 401 may be configured to have a bias toward a particular lane, such as selected by lane selection software running on computing device 401. The computing device may assign penalties to lanes other than the particular lane. This way, the route finding system may generally determine a route for the vehicle that prefers to use the particular lane due to the penalties assigned to the other lanes except when the particular lane is hindered by a slow agent. As an example result, the vehicle may change lanes back into the particular lane in situations when a slow agent is circumvented and other slow agents are not hindering the transition back into the lane.

In addition, some implementations may involve incorporation of a dynamic timer. For instance, computing device 401 may use a dynamic timer that depends on the slow lane segment speeds in order to transition faster to penalization state 404. As an example, if the slow lead agent is driving at 40 miles per hour (mph) in a 65 mph zone, computing device 401 may decrease the dynamic timer to a shorter time limit (e.g., drop from 10 seconds to 5 seconds) before transitioning from detection state 402 to penalization state 404. Alternatively, if the slow lead agent is driving at 55 mph in the 65 mph zone, computing device 401 may use a longer time limit (e.g., 10 seconds) prior to transitioning to penalization state 404. This way, computing device 401 can factor the speed of the slow lead agent and react accordingly.

In some examples, computing device 401 may further factor agent behavior predictions. For instance, computing device 401 may use sensor data to determine behavior predictions for other agents in the environment. These predictions can be used when determining actions for the vehicle. For instance, if the predicted behavior for an agent indicates the agent is likely slowing down in order to pull over onto the freeway shoulder, computing device 401 may refrain from trying to immediately change lanes around the agent.

In addition, machine learning models 406 can be used in some examples. In some cases, machine learning models 406 may be trained on labeled logged data or labeled simulated data that represents different navigation scenarios that a vehicle may experience during travel. For instance, machine learning models 406 can be developed through supervised learning and used to help vehicle systems make decisions where the vehicle may need to lane change for a slow lead agent. Using logged data from prior navigation of routes, data labelers can observe the scene, nearby traffic, lead agent speed, and pose of the vehicle. Labelers can then label the situation as either "YES" the vehicle should lane change for the slow lead agent, or "NO" the vehicle should not lane change for the slow lead agent. The labeled scenes can then be used to train a model that would help vehicle systems make decisions in novel scenarios.

Supervised learning methods can similarly be applied to simulated data to significantly augment the training dataset. For instance, artificial freeway scenarios can be created with various geometries, random traffic placements, random lead agent velocities, and random lead agent accelerations. Data labels can indicate that the situation is either a "YES" situation where the vehicle should lane change for the slow lead agent, or a "NO" situation the vehicle should not lane change for the slow lead agent. The labeled artificial scenes can be used as training data for a model that would help the vehicle make decisions in novel scenarios.

Control system 410 may be part of computing device 401 or another system that can control systems of the vehicle. For instance, control system 410 may enable the vehicle to perform lane changes based on disclosed techniques.

Computing device 401 may factor additional information when route planning. A planned route may be based on road conditions, weather data, road grade, road banking, surface friction, objects and vehicles in the environment, and so forth. A navigation strategy may be based on vehicle conditions, such as worn tires, older brakes, front wheel or four wheel drive, a number of axles, and so forth. The navigation strategy may also be based on one or more operational choices for parameters to navigate the planned route. The navigation plan may also involve dynamically adjusting navigation during operation of the vehicle.

In some embodiments, statistical models may be applied to learn various initial configurations for the autonomous control strategy. For example, a trained machine learning model may be utilized to generate a recommendation whether to responsively execute an autonomous control strategy, which can involve one or more adjustments to an operation of the vehicle to decrease the impact of a slow lead agent.

Figure 4B:
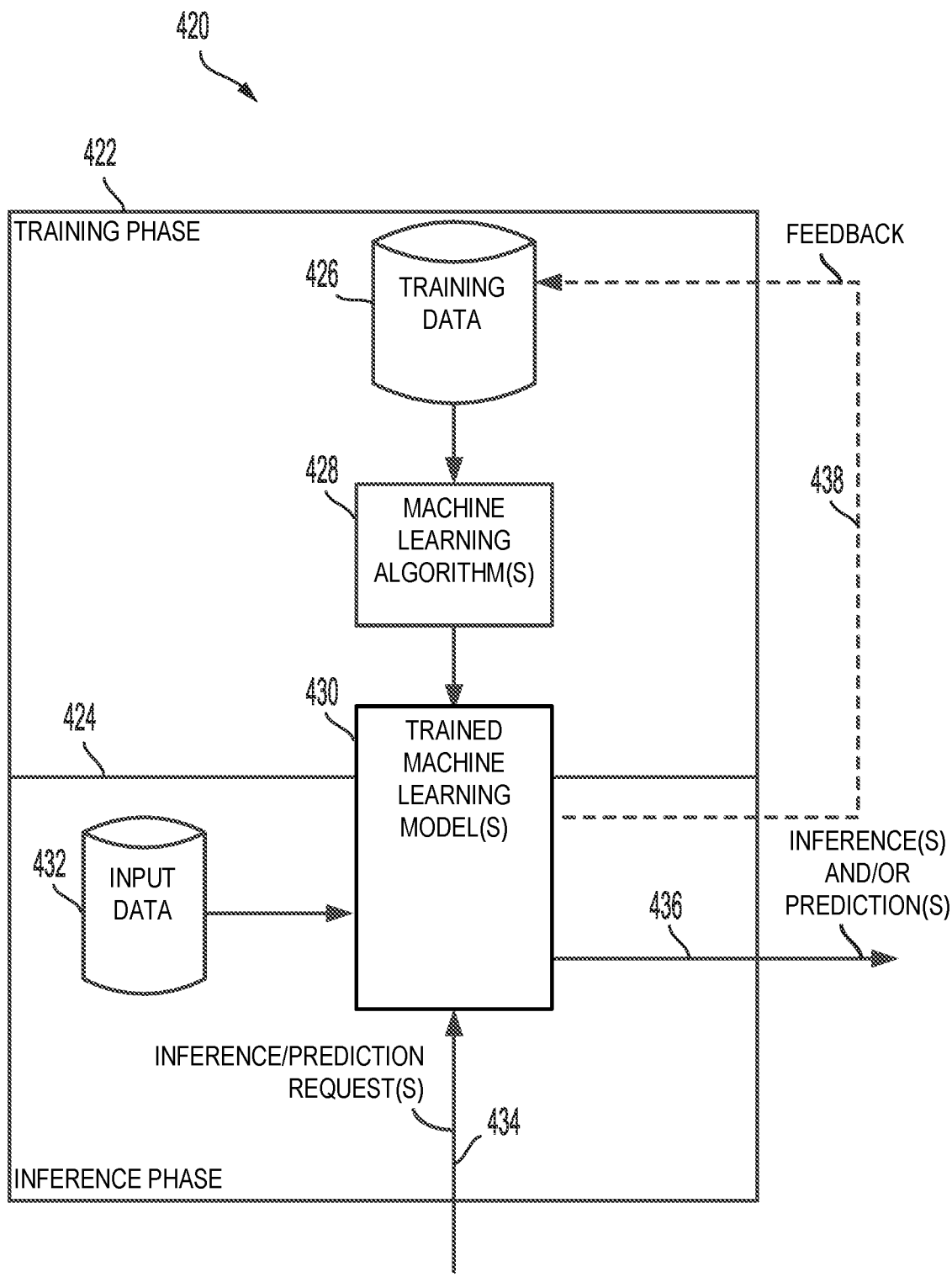
FIG. 4B is a functional block diagram illustrating a training phase and an inference phase for generating a trained machine learning model, according to one or more example embodiments.

FIG. 4B shows diagram 420 illustrating training phase 422 and inference phase 424 of trained machine learning model(s) 430. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 4B shows training phase 422 that involves one or more machine learning algorithms 420 being trained on training data 426 to generate trained machine learning model(s) 430. Then, during inference phase 424, trained machine learning model(s) 430 can receive input data 432 and one or more inference/prediction requests 434 (perhaps as part of input data 432) and responsively provide as an output one or more inferences and/or predictions 436.

Trained machine learning model(s) 430 can include one or more models of one or more machine learning algorithms 428. Machine learning algorithm(s) 428 may include, but are not limited to: an artificial neural network (e.g., a convolutional neural network, a recurrent neural network), a Bayesian network, a hidden Markov model, a Markov decision process, a logistic regression function, a support vector machine, a suitable statistical machine learning algorithm, and/or a heuristic machine learning system. Machine learning algorithm(s) 428 may be supervised or unsupervised, and may implement any suitable combination of online and offline learning.

In some examples, machine learning algorithm(s) 428 and/or trained machine learning model(s) 430 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 428 and/or trained machine learning model(s) 430. In some examples, trained machine learning model(s) 430 can be trained, reside on and executed to provide inferences on a particular computing device, and/or otherwise can make inferences for the particular computing device.

During training phase 422, machine learning algorithm(s) 428 can be trained by providing at least training data 426 as training input using unsupervised, semi-supervised, supervised, and/or reinforcement learning techniques. Unsupervised learning involves providing a portion (or all) of training data 426 to machine learning algorithm(s) 428 and machine learning algorithm(s) 428 determining one or more output inferences based on the provided portion (or all) of training data 426. In some embodiments, training of the machine learning model may involve unsupervised learning based on a loss function that measures travel time, or a disengage probability, or both. Semi-supervised learning involves having correct results for part, but not all, of training data 426. During semi-supervised learning, supervised learning is used for a portion of training data 426 having correct results, and unsupervised learning is used for a portion of training data 426 not having correct results.

Supervised learning involves providing a portion of training data 426 to machine learning algorithm(s) 428, with machine learning algorithm(s) 428 determining one or more output inferences based on the provided portion of training data 426, and the output inference(s) are either accepted or corrected based on correct results associated with training data 426. In some examples, supervised learning of machine learning algorithm(s) 428 can be governed by a set of rules and/or a set of labels for the training input, and the set of rules and/or set of labels may be used to correct inferences of machine learning algorithm(s) 428.

In some instances, models developed through supervised learning can be used to help an autonomous vehicle make decisions in situations where it may need to lane change away from a slow lead agent. For example, logged data from executed manual driving strategies, autonomous driving strategies, or both, on highway navigation and other roadways with slow lead agent situations may be utilized for supervised training of machine learning algorithm(s) 428. Data labelers may observe the scene, nearby traffic, and a pose of the autonomous vehicle. Data labelers may then label the situation as either "yes" to indicate execution of a lane change strategy away from a slow lead agent, or as "no" to indicate execution of no lane change strategy. The labeled scenes can then be used as training data 426 to train machine learning algorithm(s) 428 that would help the autonomous truck make decisions in novel driving scenarios.

Supervised learning methods may be similarly applied to simulated data to significantly augment the training data 426. Artificial freeway slow lead agent scenarios may be generated with various geometries, random traffic placements, random agent velocities, and random agent accelerations. For example, with a simulated vehicle driving in a right lane while detecting a slow lead agent, the data labeler can label the situation as either "yes" to indicate execution of a lane change strategy away from a slow lead agent, or as "no" to indicate execution of no lane change strategy. The labeled artificial scenes can be used as training data 426 to train machine learning algorithm(s) 428.

Reinforcement learning involves machine learning algorithm(s) 428 receiving a reward signal regarding a prior inference, where the reward signal can be a numerical value. During reinforcement learning, machine learning algorithm(s) 428 can output an inference and receive a reward signal in response, where machine learning algorithm(s) 428 are configured to try to maximize the numerical value of the reward signal. In some examples, reinforcement learning also utilizes a value function that provides a numerical value representing an expected total of the numerical values provided by the reward signal overtime. For example, when a discrete decision is to be selected from two or more options or plans, such as, for example, continue to drive in a first lane or change lanes to a second lane, a policy may be constructed that scores each planned trajectory against a rubric of features.

For example, scored features of a trajectory may include (but may not be limited to) a progress made with each trajectory, a difficulty of performing a lane change operation, an amount of acceleration needed by either the autonomous truck or other agents and/or vehicles in the scene in order to smoothly negotiate slow lead agent scenarios, a kinematic comfort of each trajectory, or a minimum predicted buffer provided to other agents and/or vehicles at the scene. The total score for each possible trajectory may be a weighted sum of each scored feature, and the autonomous truck may follow a plan with a lowest score. The respective feature weights may be selected by a variety of automatic and/or heuristic methods. For example, feature weights may be learned from human driving behavior in situations with slow lead agents. Also, for example, for a set of trajectories driven by a human driver in such scenarios, a technique such as inverse reinforcement learning may be applied to compute the set of feature weights. Such an approach helps mimic a logic applied by a human driver.

In some examples, machine learning algorithm(s) 428 and/or trained machine learning model(s) 430 can be trained using other machine learning techniques, including but not limited to, incremental learning and curriculum learning.

In some examples, machine learning algorithm(s) 428 and/or trained machine learning model(s) 430 can use transfer learning techniques. For example, transfer learning techniques can involve trained machine learning model(s) 430 being pre-trained on one set of data and additionally trained using training data 426. More particularly, machine learning algorithm(s) 428 can be pre-trained on data from one or more computing devices and a resulting trained machine learning model provided to a particular computing device, where the particular computing device is intended to execute the trained machine learning model during inference phase 604. Then, during training phase 422, the pre-trained machine learning model can be additionally trained using training data 426, where training data 426 can be derived from kernel and non-kernel data of the particular computing device. For instance, kernel data can exist as core components of the operating system of the computing device. This further training of the machine learning algorithm(s) 428 and/or the pre-trained machine learning model using training data 426 of the particular computing device's data can be performed using either supervised or unsupervised learning. Once machine learning algorithm(s) 428 and/or the pre-trained machine learning model has been trained on at least training data 426, training phase 422 can be completed. The trained resulting machine learning model can be utilized as at least one of trained machine learning model(s) 430.

In particular, once training phase 422 has been completed, trained machine learning model(s) 430 can be provided to a computing device, if not already on the computing device. Inference phase 424 can begin after trained machine learning model(s) 430 are provided to the particular computing device.

During inference phase 424, trained machine learning model(s) 430 can receive input data 432 and generate and output one or more corresponding inferences and/or predictions 436 about input data 432. As such, input data 432 can be used as an input to trained machine learning model(s) 430 for providing corresponding inference(s) and/or prediction(s) 436 to kernel components and non-kernel components. For example, trained machine learning model(s) 430 can generate inference(s) and/or prediction(s) 436 in response to one or more inference/prediction requests 436. In some examples, trained machine learning model(s) 430 can be executed by a portion of other software. For example, trained machine learning model(s) 430 can be executed by an inference or prediction daemon to be readily available to provide inferences and/or predictions upon request. Input data 432 can include data from the particular computing device executing trained machine learning model(s) 430 and/or input data from one or more computing devices other than the particular computing device.

Input data 432 can include one or more of real-world driving scenarios, simulated driving scenarios, or both. Artificial freeway slow lead agent scenarios may be generated with various geometries, random traffic placements, random agent velocities, and/or random agent accelerations. Other types of input data are possible as well. Input data 432 can be labeled images that indicate a preference for a lane change or not, or that select a driving strategy from one or more available strategies.

Inference(s) and/or prediction(s) 436 can include output navigation plans, output driving strategies, and/or other output data produced by trained machine learning model(s) 430 operating on input data 432 (and training data 426). In some embodiments, output inference(s) and/or prediction(s) 436 may include predicted navigation plans of other vehicles (such as a vehicle that has a high probability of an interaction with the autonomous truck, a merging vehicle, and so forth). In some examples, trained machine learning model(s) 430 can use output inference(s) and/or prediction(s) 436 as input feedback 438. Trained machine learning model(s) 430 can also rely on past inferences as inputs for generating new inferences.

Deep neural nets for determining lane change strategies can be examples of machine learning algorithm(s) 428. After training, the trained version of deep neural nets can be examples of trained machine learning model(s) 430. In this approach, an example of inference/prediction request(s) 436 can be a request to predict a driving strategy for an input scenario involving a slow lead agent and a corresponding example of inferences and/or prediction(s) 436 can be an output driving strategy.

For example, encoding a roadgraph may be of high significance for various tasks in perception and/or behavior predictions, such as lane change predictions. In some embodiments, a roadgraph may be leveraged in deep learning by rasterizing roadgraph features onto a two-dimensional (2D) top-down grid (i.e. rendered images), and then by applying a convolution neural network (CNN) on the rendered images. Such a rasterized approach may depend on various factors, such as, for example, a geometry range, a CNN receptive field (that may impose limits on a long-range understanding of geometry), and precision thresholds from the rendering. In some instances, the road graph and agent dynamics can be encoded without rendering.

In some embodiments, a hierarchical graph neural network may be used to encode the roadgraph and/or driving behavior dynamics, without rendering. The generated model may be trained in a supervised manner, as described above, or may be trained to minimize an appropriate loss function to determine lane change strategies.

In some aspects, the generated model may be a unified representation for multi-agent dynamics and structured scene context, and may be generated directly from respective vectorized representation. For example, a geographic extent of road features may be represented in geographic coordinates as a point, a polygon, and/or a curve. For example, a lane boundary may include a plurality of control points that can generate a spline. As another example, a crosswalk may be represented as a polygon defined by several points. Also, for example, a stop sign may be represented by a single point. Such entities may be approximated as geographic polylines defined by multiple control points, along with their respective attributes. Similarly, dynamics of moving agents (e.g., vehicles, pedestrians) may also be approximated by dynamic polylines based on their respective motion trajectories. The geographic and dynamic polylines may then be represented as collections of vectors.

In some embodiments, graph neural networks (GNNs) may be utilized to incorporate the collections of vectors. For example, a node in the GNN may represent a vector, and node features may be determined based on a start location and an end location of each vector, along with other attributes, such as a polyline group identifier, semantic labels, and so forth. Also, for example, context information from maps, along with the trajectories of other moving agents may be propagated to a target agent node through the GNN. Accordingly, an output node feature corresponding to the target agent may be utilized to decode future trajectories for the target agent.

One or more connectivities of the GNN may be constrained based on a spatial and/or semantic proximity of the nodes. Accordingly, a hierarchical graph architecture may be generated, where vectors belonging to the same polylines with the same semantic labels are connected and embedded into polyline features, and all polylines may then be fully connected with each other to exchange information. In some embodiments, local graphs may be implemented with multi-layer perceptrons, and the global graphs may be implemented with self-attention.

In some embodiments, the image rendering approach may be combined with the hierarchical graph neural network approach to train machine learning algorithm(s) 428.

In some examples, a first computing device can include the trained version of the machine learning model. Then, the first computing device can receive requests to predict lane change strategies, and use the trained version of the machine learning model to predict the lane change strategy. In some examples, two or more computing devices, such as a client device and a server device can be used to provide the output; e.g., the client device can generate and send requests to predict lane change strategies to the server device. Then, the server device can use the trained version of the machine learning model to predict the lane change strategies. Then, upon reception of responses to the requests, the client device can provide the requested output via one or more control interfaces.

Figure 5A:
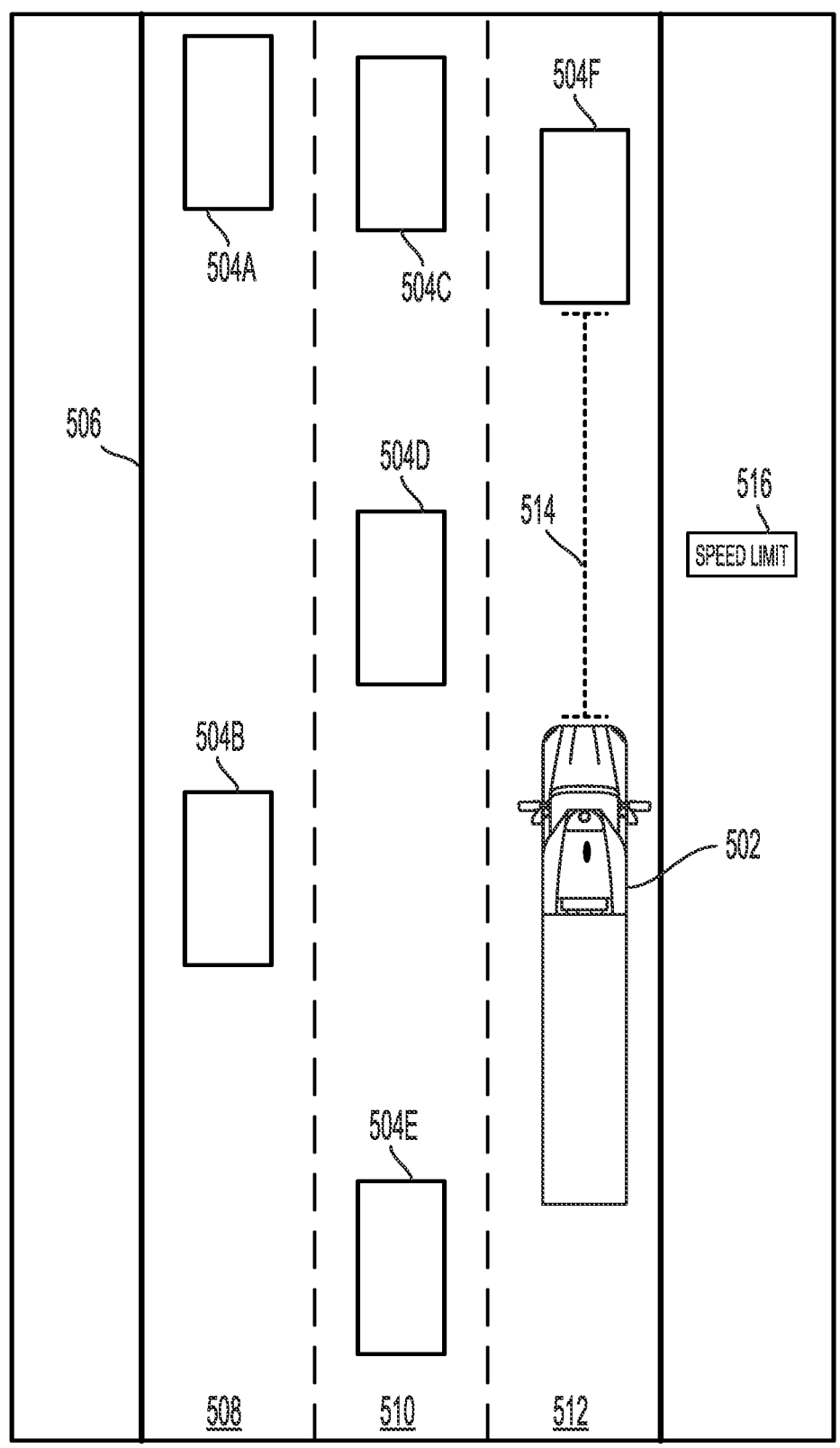
FIG. 5A depicts a scenario involving a slow lead agent, according to one or more example embodiments.

FIG. 5A depicts scenario 500 involving vehicle 502 performing lane adjustment techniques disclosed herein. In scenario 500, vehicle 502 is navigating at a path on road 506. As shown, road 506 is a multiple lane road that includes lane 508, lane 510, and lane 512. For instance, road 506 may be part of a highway where vehicles travel at high speeds in some implementations. In the example, speed limit sign 516 is included to convey the minimum and/or the maximum speed limit for vehicles traveling on road 506.

Vehicle 502 is shown navigating in lane 512, which is the right-most lane of road 506. In particular, vehicle 502 is shown as a truck pulling a trailer and may be traveling in lane 512 since lane 512 is typically used by slower traffic while faster traffic uses lane 508. In addition to vehicle 502, vehicle 504A, vehicle 504B, vehicle 504C, vehicle 504D, vehicle 504E, and vehicle 504F are also shown navigating on road 506 in the same direction as vehicle 502. In scenario 500, vehicle 504A and vehicle 504B are shown traveling in lane 504, vehicles 504C-504E are shown traveling in lane 510, and vehicle 504F is traveling at a position in front of the vehicle 502 in lane 512.

Vehicle 504F can represent a slow lead agent that may negatively impact navigation by vehicle 502. In scenario 500, vehicle 504F can be traveling slower than the current speed of vehicle 502, which may require vehicle 502 to either slow down or perform another maneuver to avoid a collision with vehicle 504F. For scenario 500 and similar situations, vehicle 502 may perform disclosed techniques to determine an adjustment strategy in response to detecting vehicle 504F.

As vehicle 502 navigates road 506, vehicle systems use sensor data from one or more types of vehicle sensors to perceive and navigate the surrounding dynamic environment. For instance, vehicle systems may use a combination of map data, image data, and/or other types of data to detect and measure information about vehicles 504A-504F and other aspects of the environment (e.g., the positions of lanes 508-512). Vehicle 502 can also obtain speed limit information for road 506 by detecting and analyzing speed limit sign 516 and/or based on map data.

Figure 5B:
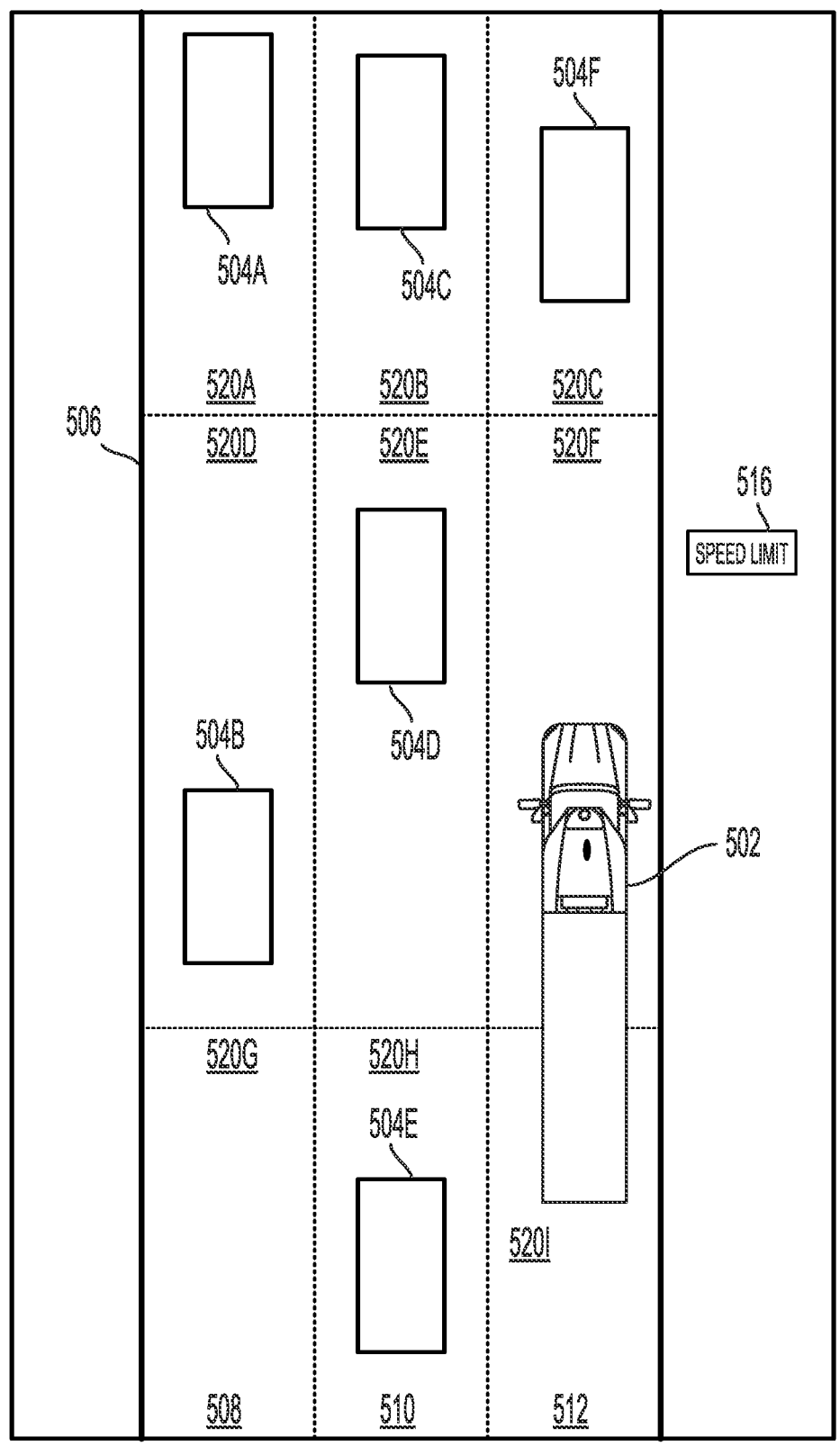
FIG. 5B depicts a division of the roadway into lane segments for speed data aggregation, according to one or more example embodiments.
Figure 5C:
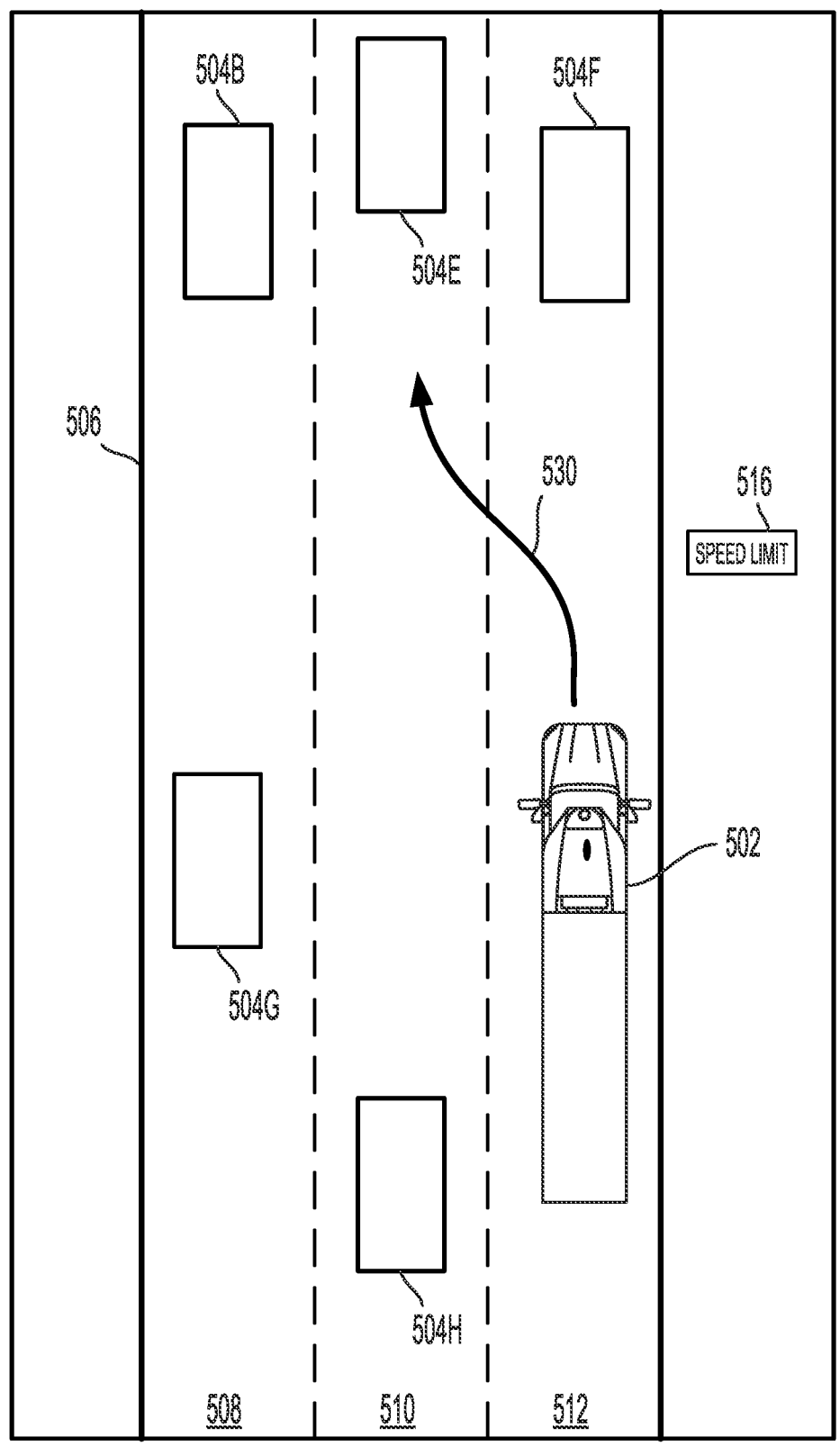
FIG. 5C depicts the vehicle determining whether to perform a lane change, according to one or more example embodiments.

Vehicle 502 may use sensor data to detect and determine if vehicle 504F qualifies as a slow lead agent that may require an adjustment of the current path of vehicle 502. For instance, vehicle 502 may monitor road 506 according to lane segments as shown in FIG. 5B. The example division of road 506 into lane segments 520A, 520B, 520C, 520D, 520E, 520F, 520G, and 520I may enable vehicle 502 to efficiently detect slow lead agents and determine if a better path is available based on surrounding traffic. These lane segments 520A-520I are illustrated for example purposes and can differ within example implementations. For instance, the segmentation of the environment during sensor processing can depend on the position and the field of view of sensors coupled to the vehicle. These sensors can capture sensor data that enables processing systems to determine speed data for the vehicles and other agents (e.g., bicyclists) that are navigating nearby vehicle 502.

Vehicle 502 may monitor and aggregate speed data for each lane segment 520A-520I. For instance, speed data measured based on travel of vehicle 504A can be aggregated for lane segment 520A while speed data obtained based on vehicle 504B can be aggregated for lane segment 520D. Similarly, speed data measured for vehicle 504C can be associated with lane segment 520B, speeds of vehicle 504D for lane segment 502E, speed data captured from vehicle 504E can be aggregated for lane segment 520H. In addition, vehicle 502 can use speed data measured of vehicle 504F to aggregate speed statistics for lane segment 520C.

The aggregated speed statistics for lane segments 520A-520I can be used to safely control vehicle 502 as the dynamic surrounding environment changes. In some cases, vehicle 502 may use speed data aggregated for lane segment 520C to determine that a slow lead agent is positioned in front of vehicle 502. In particular, vehicle systems may use speed data to determine that vehicle 504F is positioned in lane 512 in front of vehicle 502 and also traveling below a minimum speed threshold. The minimum speed threshold can be one or multiple speed levels that vehicle 502 can use to analyze scenario 500 and determine if the speed of vehicle 504F may require vehicle 502 to perform a lane change.

In some embodiments, vehicle 502 may use sensor data to determine the minimum threshold speed. For instance, camera data can be captured by a vehicle camera that enables vehicle systems to detect and identify the speed limit specified by speed limit sign 516. Vehicle 502 may set the minimum threshold speed for detecting slow agents based on speed limit sign 516. In other examples, vehicle 502 may use a speed limit specified by map data or another source.

In addition, in scenario 500, vehicle 502 is shown configured to detect vehicle 504F as a slow lead agent based on threshold distance 514. For instance, vehicle systems may use incoming sensor data representing a lane segment that is approximately 500 meters to initially detect slow agents. Other distances can be used and may differ based on the situation. For instance, when a vehicle changes from another lane and into a position in front of vehicle 502 (e.g., if vehicle 504D moves into lane 512 ahead of vehicle 502), vehicle systems may adjust navigation accordingly. Particularly, vehicle systems can monitor if the new lead agent vehicle is a slow agent at a distance that is less than 500 meters in this situation. As such, vehicle systems may use sensor data representing the areas containing vehicle 504D to decide whether to perform a lane maneuver around vehicle 504D or apply the brakes.

In some examples, vehicle 502 may assign a score to each lane segment based on respective speed data for lane segments 520A-520I. The scores of the lane segments can serve as a system that enables comparison between the different lane segments. As such, the speed data may convey the average speed of agents traveling in the lane segment during a time period. Speed data can also indicate other information, such as a maximum speed and a minimum speed traveled by an agent in the lane segment during the time period. The scores for lane segments can be used for comparison purposes. In particular, vehicle 502 may use the different scores to plan a path for vehicle 502 to subsequently navigate as the surrounding environment changes.

If the speed aggregated for lane segment 520C remains below the minimum threshold by a threshold time, vehicle 502 may assign a penalty to lane segment 520C. In particular, penalizing lane segment 520C can trigger vehicle systems to potentially modify current navigation of vehicle 520 to temporarily avoid lane segment 520C. This may involve performing a lane change into lane 510. The failure of vehicle 504F to increase speed can delay vehicle 502 and potentially increase the risk of another vehicle colliding into vehicle 502 due to the slow speed.

Vehicle 502 may determine whether to perform a lane change maneuver based on a comparison of the score of lane segment 520C relative to other lane segment scores. As an example, a router module on vehicle 502 may propose a lane change based on penalties assigned to different lane segments around vehicle 502. A planner module on vehicle 502 may then determine whether or not to perform the lane change based on other factors, such as nearby traffic and other dynamic aspects of the surrounding environment.

In some examples, vehicle 502 may compare respective scores of lane segments 520B, 520E, 520H positioned in lane 510 to determine if traffic in general on road 506 is slowing day travel overall and vehicle 504F likely is traveling slow like the rest of traffic. The scores can reflect which lane segments are penalized for slow agents or other potential reasons. In other cases, however, speed data for lane segments 520B, 520E, and 520H may show that vehicles are traveling above the minimum threshold speed, which signals that vehicle 504F is a slow lead agent that can be passed. In such situations, vehicle 502 may monitor surrounding activity and perform the lane change if a gap is available in lane 510.

In some examples, a dynamic timer is used by vehicle 502 during slow lead agent detection. For instance, the dynamic timer can be used as the threshold time that determines if the speed of vehicle 504F stays at a level that requires penalizing lane segment 520C.

In some examples, a navigation plan for vehicle 502 may be based on a cost allocation associated with one or more lanes 508-512 on road 506. The term "cost allocation" generally refers to a cost associated with driving according to a particular route. Generally, the higher the cost, the more prohibitive the route. Navigation plans for vehicle 502 can be selected based on a route that has a low associated cost allocation. For example, lane 510 may have an oil slick or black ice, whereas lane 512 may be dry. Accordingly, the cost allocation for lane 510 may be higher than the cost allocation for lane 512. As another example, lane 508 may have more vehicular traffic than lane 510. Accordingly, the cost allocation for lane 508 may be higher than the cost allocation for lane 510. Various factors may contribute to a cost associated with a candidate path (including the presence of a slow lead agent), and a cost allocation may be an aggregate of all costs associated with the candidate path.

Figure 6:
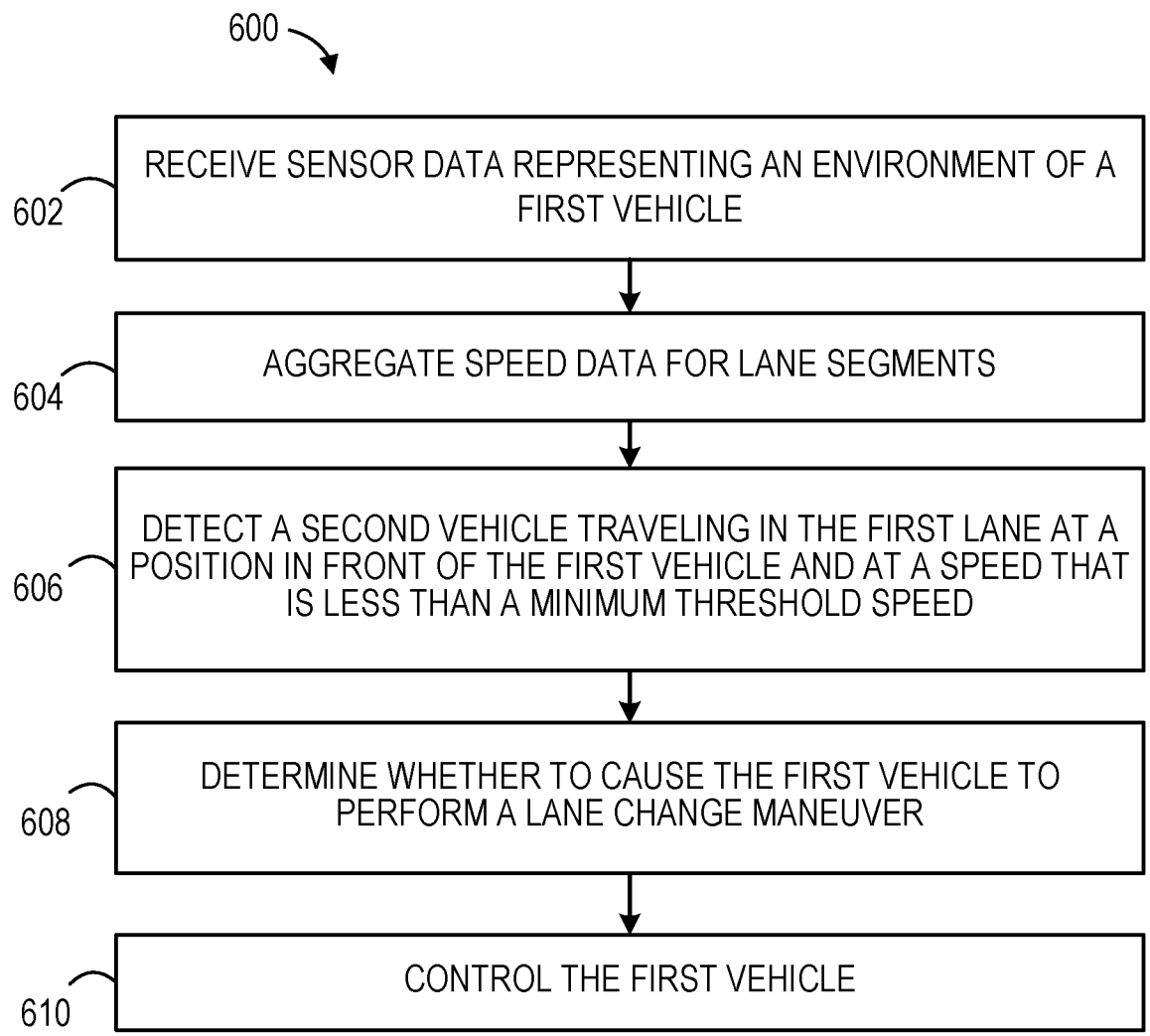
FIG. 6 is a flowchart of a method for automatic lane adjustments, according to one or more example embodiments.

FIG. 6 is a method for an example lane adjustment technique. Method 600 represents an example method that may include one or more operations, functions, or actions, as depicted by one or more of blocks 602, 604, 606, 608, and 610, each of which may be carried out by any of the systems, devices, and/or vehicles shown in FIGS. 1-5C, among other possible systems. For instance, computing device 300 depicted in FIG. 3 or system 400 shown in FIG. 4A may perform method 600.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as may be understood by those reasonably skilled in the art.

At block 602, method 600 involves receiving sensor data representing an environment of a first vehicle as the first vehicle navigates a path in a first lane of a multiple lane road. A computing device may receive the sensor data from one or multiple vehicle sensors and can be positioned onboard the first vehicle. For instance, the computing device may receive sensor data from a first type of sensor (cameras) and a second type of sensor (e.g., lidar).

At block 604, method 600 involves aggregating speed data for lane segments based on the sensor data. Speed data for a lane segment is based on measurements of one or more vehicles traveling in the lane segment. For instance, speed data can represent the last 10 seconds of navigation around the vehicle in some embodiments. In other examples, the duration can vary and speed data can be aggregated in real-time.

At block 606, method 600 involves detecting a second vehicle traveling in the first lane at a position in front of the first vehicle and at a speed that is less than a minimum threshold speed. The computing device uses speed data for the lane segments to detect and measure the speed of the second vehicle. For instance, the computing device can be monitoring a lane segment of the first lane positioned a threshold distance in front of the first vehicle. The threshold distance can depend on the speed of the first vehicle and conditions of the environment. For instance, conditions that can influence the threshold distance include weather conditions (e.g., snowy or wet road), road grade, and/or presence of construction zones or emergency vehicles, among others. The computing device can then detect the second vehicle traveling in the lane segment of the first lane.

In some examples, the computing device may determine a speed limit for the multiple lane road and determine the minimum threshold speed based on the speed limit for the multiple lane road. For instance, the computing device may determine the speed limit for the multiple lane road based on images captured by one or more cameras coupled to the vehicle. In some cases, the computing device may also aggregate speed data for a second lane positioned adjacent to the first lane based on sensor data measuring one or more vehicles traveling in the second lane and adjust the minimum threshold speed based on the speed data for the second lane.

At block 608, method 600 involves determining whether to cause the first vehicle to perform a lane change maneuver responsive to detecting the second vehicle failing to increase speed above the minimum threshold speed by a threshold time.

In some examples, the computing device may determine a difference between the speed of the second vehicle and the minimum threshold speed based on detecting the second vehicle traveling in the first lane at the position in front of the first vehicle and at the speed that is less than the minimum threshold speed. The computing device may set the threshold time based on the difference between the speed of the second vehicle and the minimum threshold speed. For instance, setting the threshold time can be based on an inverse relationship between the threshold time and the difference between the speed of the second vehicle and the minimum threshold speed.

In some examples, a trailer is coupled to the first vehicle and the computing device can further determine whether to cause the first vehicle to perform the lane change maneuver based on parameters of the trailer. For instance, the parameters can include a length of the trailer, a height of the trailer, and a weight of the trailer.

In some examples, the computing device may determine whether to cause the first vehicle to perform the lane change maneuver based on an output from a machine learning model. In some cases, the machine learning model provides the output based on sensor data, road graph, behavior predictions for other agents, and/or prior training via a plurality of navigation scenarios.

At block 610, method 600 involves controlling the first vehicle based on determining whether to cause the first vehicle to perform the lane change maneuver.

In some implementations, method 600 may involve dividing the multiple lane road into multiple lane segments where each lane segment is located relative to the vehicle. For instance, the lane segments can be lanes divided into portions based on distance away from the vehicle. Method 600 can further involve aggregating speed data for each lane segment of the multiple lane segments. Speed data for a given lane segment represents an average speed based on measurements of one or more vehicles traveling in the given lane segment. The computing device may obtain speed data that conveys a maximum speed and a minimum speed of one or more vehicles traveling in the given lane segment. The computing device may obtain other speed data as well. Based on speed data for one or more lane segments that correspond to a second lane, the computing device may determine an average speed of travel in the second lane, which is adjacent to the first lane. For instance, the computing device can determine whether to cause the first vehicle to perform the lane change maneuver based on the average speed of travel in the second lane. In another example, the computing device can determine whether to cause the first vehicle to perform the lane change maneuver based on the minimum speed in the traffic data associated with one or more lanes.

The computing device may also determine that the average speed of travel in the second lane is faster than the speed of the second vehicle and cause the first vehicle to perform the lane change maneuver into the second lane based on determining that the average speed of travel in the second lane is faster than the speed of the second vehicle. In some examples, the computing device may determine that the first vehicle has passed the second vehicle by at least a buffer distance that extends in front of the second vehicle while traveling in the second lane and cause the first vehicle to perform a second lane change maneuver from the second lane and into the first lane responsive to determining that the first vehicle has passed the second vehicle by at least the buffer distance.

In some examples, the computing device aggregates speed data for multiple lane segments surrounding the first vehicle as the first vehicle navigates the path. In particular, speed data for a given lane segment can represent a minimum speed (or other values (e.g., average, max, or other statistical speed-based value) based on measurements of one or more vehicles traveling in the given lane segment. The computing device can assign a score to each lane segment based on respective speed data for the plurality of lane segments. The score of a given lane segment depends on if a minimum speed for the given lane segment exceeds the minimum threshold speed. In some examples, the computing device is further configured to determine that the speed of the second vehicle failed to increase above the minimum threshold speed by the threshold time and penalize a score of a particular lane segment. In some cases, the second vehicle is traveling in the particular lane segment. The computing device may then determine whether to cause the first vehicle to perform a lane change maneuver based on the score of the particular lane segment relative to respective scores of lane segments corresponding to a second lane of the multiple lane road. The second lane can be positioned adjacent to the first lane. As such, the computing device can be configured to adjust the path of the first vehicle based on respective scores of the plurality of lane segments.

Figure 7:
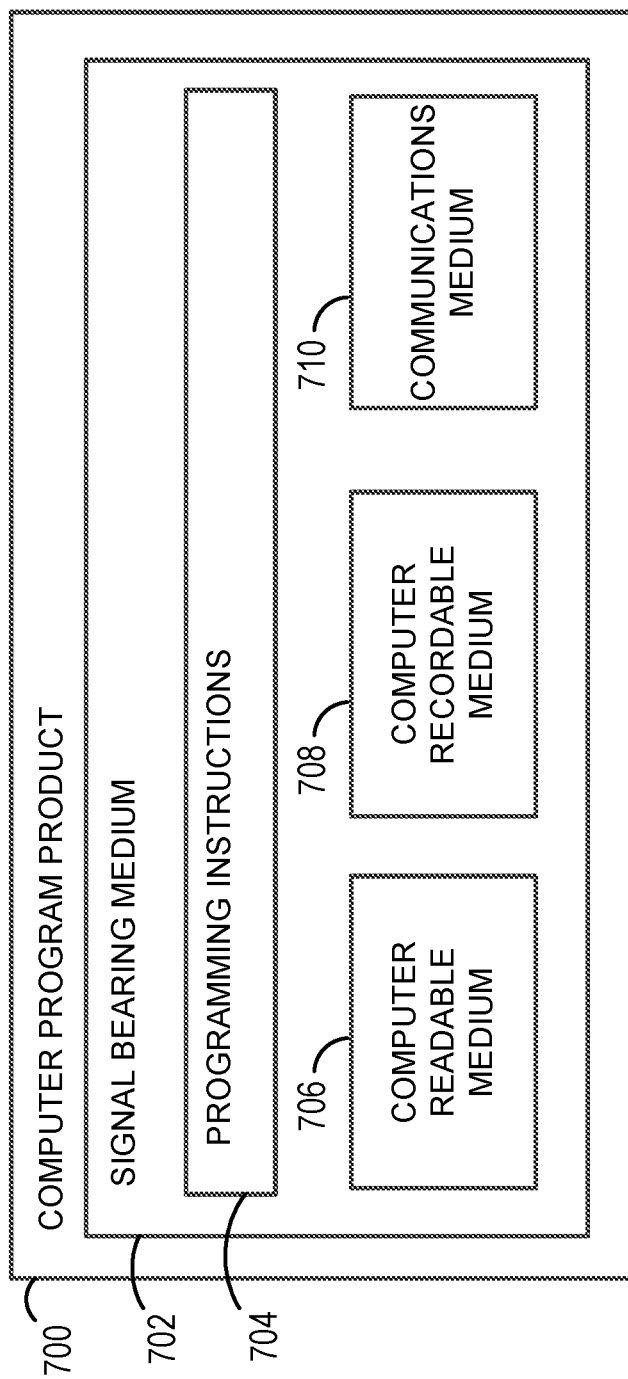
FIG. 7 is a schematic diagram of a computer program, according to one or more example embodiments.

FIG. 7 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

Example computer program product 700 may be provided using signal bearing medium 702, which may include one or more programming instructions 704 that, when executed by one or more processors may provide functionality or portions of the functionality described above with respect to FIGS. 1-6. In some examples, the signal bearing medium 702 may encompass non-transitory computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 may be configured to provide various operations, functions, or actions in response to the programming instructions 704 conveyed to the computer system 112 by one or more of the computer readable medium 706, the computer recordable medium 708, and/or the communications medium 710.

The non-transitory computer readable medium could also be distributed among multiple data storage elements, which could be remotely located from each other. The computing device that executes some or all of the stored instructions could be a vehicle, such as vehicle 200 illustrated in FIG. 2A-2D, among other possibilities. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   receiving, at a computing device coupled to a first vehicle, sensor data representing an environment of the first vehicle as the first vehicle navigates a path in a first lane of a multiple lane road;
   based on the sensor data, aggregating speed data for a plurality of lane segments, wherein speed data for a lane segment is based on measurements of one or more vehicles traveling in the lane segment;
   based on speed data for the plurality of lane segments, detecting a second vehicle traveling in the first lane at a position in front of the first vehicle and at a speed that is less than a minimum threshold speed;
   responsive to determining that the speed of the second vehicle failed to increase above the minimum threshold speed by a threshold time, determining whether to cause the first vehicle to perform a lane change maneuver;
   based on causing the first vehicle to perform the lane change maneuver, determining that the first vehicle has passed the second vehicle by at least a buffer distance that extends in front of the second vehicle while traveling in the second lane; and
   causing the first vehicle to perform a second lane change maneuver from the second lane and into the first lane responsive to determining that the first vehicle has passed the second vehicle by at least the buffer distance.

2. The method of claim 1, wherein aggregating speed data for the plurality of lane segments further comprises:
   obtaining speed data that conveys a maximum speed and a minimum speed of one or more vehicles traveling in each lane segment.

3. The method of claim 2, further comprising:
   based on speed data for one or more lane segments that correspond to a second lane, determining a minimum speed of travel in the second lane, wherein the second lane is adjacent to the first lane; and
   wherein determining whether to cause the first vehicle to perform the lane change maneuver comprises:
   determining whether to cause the first vehicle to perform the lane change maneuver based on the minimum speed of travel in the second lane.

4. The method of claim 3, further comprising:
   determining that the minimum speed of travel in the second lane is faster than the speed of the second vehicle; and
   causing the first vehicle to perform the lane change maneuver into the second lane based on determining that the minimum speed of travel in the second lane is faster than the speed of the second vehicle.

5. The method of claim 1, further comprising:
   determining a speed limit for the multiple lane road; and
   determining the minimum threshold speed based on the speed limit for the multiple lane road.

6. The method of claim 5, wherein determining the speed limit for the multiple lane road comprises:
   determining the speed limit for the multiple lane road based on images captured by one or more cameras coupled to the first vehicle.

7. The method of claim 6, further comprising:
   aggregating speed data for a second lane positioned adjacent to the first lane based on sensor data measuring one or more vehicles traveling in the second lane; and
   adjusting the minimum threshold speed based on the speed data for the second lane.

8. The method of claim 1, wherein receiving sensor data representing the environment of the first vehicle comprises:
   receiving sensor data from a first type of sensor and a second type of sensor.

9. The method of claim 1, further comprising:
   assigning a penalty to one or more lane segments based on the speed data for the one or more lane segments; and
   determining a path for the first vehicle to navigate based on respective penalties assigned to one or more lane segments.

10. The method of claim 1, further comprising:
    based on detecting the second vehicle traveling in the first lane at the position in front of the first vehicle and at the speed that is less than the minimum threshold speed, determining a difference between the speed of the second vehicle and the minimum threshold speed; and
    setting the threshold time based on the difference between the speed of the second vehicle and the minimum threshold speed.

11. The method of claim 10, wherein setting the threshold time is further based on an inverse relationship between the threshold time and the difference between the speed of the second vehicle and the minimum threshold speed.

12. The method of claim 1, wherein determining whether to cause the first vehicle to perform the lane change maneuver comprises:
    determining whether to cause the first vehicle to perform the lane change maneuver based on an output from a machine learning model, wherein the machine learning model provides the output based on sensor data and prior training via a plurality of navigation scenarios.

13. The method of claim 1, wherein detecting the second vehicle traveling in the first lane at the position in front of the first vehicle comprises:
monitoring a lane segment of the first lane positioned at a threshold distance in front of the first vehicle, wherein the threshold distance depends on a speed of the first vehicle and a conditions of the environment; and
detecting the second vehicle traveling in the lane segment of the first lane positioned at the threshold distance in front of the first vehicle.

14. A system comprising:
a first vehicle;
a computing device coupled to the first vehicle and configured to:
receive sensor data representing an environment of the first vehicle as the first vehicle navigates a path in a first lane of a multiple lane road;
based on the sensor data, aggregate speed data for a plurality of lane segments, wherein speed data for a lane segment is based on measurements of one or more vehicles traveling in the lane segment;
based on speed data for the plurality of lane segments, detect a second vehicle traveling in the first lane at a position in front of the first vehicle and at a speed that is less than a minimum threshold speed;
responsive to determining that the speed of the second vehicle failed to increase above the minimum threshold speed by a threshold time, determine whether to cause the first vehicle to perform a lane change maneuver;
based on causing the first vehicle to perform the lane change maneuver, determine that the first vehicle has passed the second vehicle by at least a buffer distance that extends in front of the second vehicle while traveling in the second lane; and
cause the first vehicle to perform a second lane change maneuver from the second lane and into the first lane responsive to determining that the first vehicle has passed the second vehicle by at least the buffer distance.

15. The system of claim 14, wherein a trailer is coupled to the first vehicle, and wherein the computing device is further configured to:
determine whether to cause the first vehicle to perform the lane change maneuver based on parameters of the trailer, wherein the parameters of the trailer include a length of the trailer, a height of the trailer, and a weight of the trailer.

16. The system of claim 14, wherein the computing device is further configured to:
assign a penalty to one or more lane segments based on the one or more lane segments having respective minimum speeds less than the minimum threshold speed.

17. The system of claim 16, wherein the computing device is further configured to:
determine that the speed of the second vehicle failed to increase above the minimum threshold speed by the threshold time;
assign a penalty to a particular lane segment, wherein the second vehicle is traveling in the particular lane segment; and
determine whether to cause the first vehicle to perform a lane change maneuver based on respective penalties assigned to the plurality of lane segments.

18. The system of claim 17, wherein the computing device is configured to adjust the path of the first vehicle based on respective penalties assigned to the plurality of lane segments.

19. A non-transitory computer readable medium configured to store instructions, that when executed by a computing device, causes the computing device to perform operations comprising:
receiving sensor data representing an environment of a first vehicle as the first vehicle navigates a path in a first lane of a multiple lane road;
based on the sensor data, aggregating speed data for a plurality of lane segments, wherein the speed data for a lane segment is based on measurements of one or more vehicles traveling in the lane segment;
based on speed data for the plurality of lane segments, detecting a second vehicle traveling in the first lane at a position in front of the first vehicle and at a speed that is less than a minimum threshold speed;
responsive to determining that the speed of the second vehicle failed to increase above the minimum threshold speed by a threshold time, determining whether to cause the first vehicle to perform a lane change maneuver;
based on causing the first vehicle to perform the lane change maneuver, determining that the first vehicle has passed the second vehicle by at least a buffer distance that extends in front of the second vehicle while traveling in the second lane; and
causing the first vehicle to perform a second lane change maneuver from the second lane and into the first lane responsive to determining that the first vehicle has passed the second vehicle by at least the buffer distance.

* * * * *

UNITED STATES PATENT AND TRADEMARK OFFICE
CERTIFICATE OF CORRECTION

| | | |
|---|---|---|
| PATENT NO. | : 12,162,492 B2 | Page 1 of 1 |
| APPLICATION NO. | : 17/812317 | |
| DATED | : December 10, 2024 | |
| INVENTOR(S) | : Pablo Abad et al. | |

It is certified that error appears in the above-identified patent and that said Letters Patent is hereby corrected as shown below:

On the Title Page

Item (72)
"Karen Rajen Parikh, Mountain View CA (US)" should be corrected to read --Karan Rajen Parikh, Bellevue, WA (US)--

Signed and Sealed this
Eleventh Day of March, 2025

Coke Morgan Stewart
*Acting Director of the United States Patent and Trademark Office*